United States Patent
Tie et al.

(10) Patent No.: US 12,363,637 B2
(45) Date of Patent: Jul. 15, 2025

(54) TERMINAL DEVICE WAKEUP METHOD AND APPARATUS, NETWORK DEVICE, AND TERMINAL DEVICE

(71) Applicant: HUAWEI TECHNOLOGIES CO., LTD., Guangdong (CN)

(72) Inventors: Xiaolei Tie, Shanghai (CN); Han Zhou, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 470 days.

(21) Appl. No.: 17/518,390

(22) Filed: Nov. 3, 2021

(65) Prior Publication Data

US 2022/0060986 A1 Feb. 24, 2022

Related U.S. Application Data

(63) Continuation of application No. PCT/CN2020/088452, filed on Apr. 30, 2020.

(30) Foreign Application Priority Data

May 3, 2019 (CN) .......................... 201910366422.3

(51) Int. Cl.
*H04W 52/02* (2009.01)
*H04W 72/0453* (2023.01)
*H04W 72/23* (2023.01)

(52) U.S. Cl.
CPC ... *H04W 52/0232* (2013.01); *H04W 72/0453* (2013.01); *H04W 72/23* (2023.01)

(58) Field of Classification Search
CPC ... H04W 68/02; H04W 76/28; H04W 68/005; H04W 52/0212; H04W 52/0216;
(Continued)

(56) References Cited

U.S. PATENT DOCUMENTS

2017/0111875 A1 4/2017 Azizi et al.
2018/0279274 A1* 9/2018 Sun ..................... H04W 52/367
(Continued)

FOREIGN PATENT DOCUMENTS

CN 109219113 A 1/2019
CN 109314869 A 2/2019
(Continued)

OTHER PUBLICATIONS

Extended European Search Report issued in European Application No. 20801465.4 on Jun. 17, 2022, 15 pages.
(Continued)

*Primary Examiner* — Quoc Thai N Vu
(74) *Attorney, Agent, or Firm* — Fish & Richardson P.C.

(57) ABSTRACT

The present disclosure relates to terminal device wakeup methods and apparatus, network devices, and terminal devices. One example method includes receiving, by a first terminal device, configuration information of a first wakeup indication from a network device, where the first wakeup indication is used to indicate whether the first terminal device is to wake up, detecting, by the first terminal device, the first wakeup indication based on the configuration information, and in response to that the first wakeup indication is not detected, waking up, by the first terminal device, when the configuration information comprises first indication information. The first indication information is used to indicate the first terminal device to wake up when the first wakeup indication is not detected.

21 Claims, 6 Drawing Sheets

(58) Field of Classification Search
CPC ......... H04W 52/0229; H04W 52/0232; H04W 52/0235; H04W 52/02; H04W 52/0248; H04W 72/0453; H04W 72/20; H04W 72/23; Y02D 30/70
See application file for complete search history.

(56) References Cited

U.S. PATENT DOCUMENTS

| | | | | |
|---|---|---|---|---|
| 2019/0150114 | A1* | 5/2019 | Liu | H04W 52/0229 370/252 |
| 2020/0145921 | A1* | 5/2020 | Zhang | H04W 52/0235 |

FOREIGN PATENT DOCUMENTS

| | | |
|---|---|---|
| WO | 2012149319 A1 | 11/2012 |
| WO | 2018050087 A1 | 3/2018 |
| WO | 2018202693 A1 | 11/2018 |
| WO | 2018204799 A1 | 11/2018 |

OTHER PUBLICATIONS

Huawei et al., "On support for UE-group wake-up signal," 3GPP TSG RAN WG1 Meeting #94bis, R1-1810082, Chengdu, China, Oct. 8-12, 2018, 6 pages.
InterDigital, Inc., "On Triggering of Power Mode Adaptation," 3GPP TSG RAN WG1 Ad-Hoc Meeting 1901, R1-1900814, Taipei, Taiwan, Jan. 21-25, 2019, 5 pages.
Qualcomm Incorporated, "PDCCH-based power saving channel design," 3GPP TSG-RAN WG1 #96bis, R1-1905031, Xi'an, China, Apr. 8-12, 2019, 13 pages.
Sony, "Considerations of using WUS in efeMTC," 3GPP TSG TAN WG1 Meeting #92bis, R1-1804604, Sanya, China, Apr. 16-20, 2018, 6 pages.
Office Action in Chinese Appln. No. 201910366422.3, dated Dec. 28, 2022, 9 pages.
3GPP TS 36.133 V16.1.0 (Mar. 2019), "3rd Generation Partnership Project; Technical Specification Group Radio Access Network;Evolved Universal Terrestrial Radio Access (E-UTRA); Requirements for support of radio resource management(Release 16)," Mar. 2019, 3118 pages.
3GPP TS 36.212 V15.5.0 (Mar. 2019), "3rd Generation Partnership Project; Technical Specification Group Radio Access Network;Evolved Universal Terrestrial Radio Access (E-UTRA); Multiplexing and channel coding(Release 15)," Mar. 2019, 246 pages.
3GPP TS 38.212 V15.5.0 (Mar. 2019), "3rd Generation Partnership Project; Technical Specification Group Radio Access Network; NR; Multiplexing and channel coding (Release 15)," Mar. 2019, 101 pages.
3GPP TS 38.213 V15.5.0 (Mar. 2019), "3rd Generation Partnership Project; Technical Specification Group Radio Access Network; NR;Physical layer procedures for control(Release 15)," Mar. 2019, 104 pages.
3GPP TS 38.321 V15.5.0 (Mar. 2019), "3rd Generation Partnership Project; Technical Specification Group Radio Access Network; NR;Medium Access Control (MAC) protocol specification(Release 15)," Mar. 2019, 78 pages.
3GPP TS 38.331 V15.5.1 (Apr. 2019), "3rd Generation Partnership Project; Technical Specification Group Radio Access Network;NR; Radio Resource Control (RRC) protocol specification(Release 15)," Apr. 2019, 491 pages.
Huawei et al., "PDCCH-based power saving signal/channel," 3GPP TSG RAN WG1 Meeting #97, R1-1906005, Reno, USA, May 13-17, 2019, 10 pages.
InterDigital, Inc., "PDCCH-based Power Saving Signal Design," 3GPP TSG RAN WG1 #99, R1-1912736, Reno, USA, Nov. 18-22, 2019, 6 pages.
OPPO, "Impacts of PDCCH-based wake up signalling," 3GPP TSG-RAN WG2 Meeting #106, R2-1905603, Reno, USA, May 13-17, 2019, 6 pages.
PCT International Search Report and Written Opinion issued in International Application No. PCT/CN2020/088452 on Jul. 17, 2020, 22 pages (with English translation).
Office Action issued in Indian Application No. 202117051327 on Jun. 1, 2022, 5 pages.
Vivo, "PDCCH-based power saving signal/channel," 3GPP TSG RAN WG1 #97, R1-1906170, Reno, USA, May 13-17, 2019, 12 pages.
Office Action in Japanese Appln. No. 2021-565833, dated Nov. 8, 2022, 8 pages (with English translation).

* cited by examiner

# TERMINAL DEVICE WAKEUP METHOD AND APPARATUS, NETWORK DEVICE, AND TERMINAL DEVICE

CROSS-REFERENCE TO RELATED APPLICATIONS

This application is a continuation of International Application No. PCT/CN2020/088452, on Apr. 30, 2020, which claims priority to Chinese Patent Application No. 201910366422.3, filed on May 3, 2019. The disclosures of the aforementioned applications are hereby incorporated by reference in their entireties.

TECHNICAL FIELD

This application relates to the communications field, and more specifically, to a terminal device wakeup method and apparatus, a network device, and a terminal device.

BACKGROUND

To reduce power consumption of a terminal device, a network device may configure a discontinuous reception (discontinuous reception, DRX) mechanism for a terminal device in a radio resource control (radio resource control, RRC) connected state, so that the terminal device can wake up when monitoring is required, so as to monitor a physical downlink control channel (physical downlink control channel, PDCCH); and enter a sleep state when monitoring is not required.

Usually, the network device may send a wakeup indication to the terminal device before the terminal device needs to wake up, so as to indicate whether the terminal device needs to wake up.

In some cases, the network device needs to wake up the terminal device. However, because the terminal device does not detect the wakeup indication, the terminal device considers that the terminal device does not need to wake up, and is not to monitor the PDCCH. In this way, the terminal device misses a scheduling opportunity of a DRX cycle, and this increases a data receiving and sending delay.

SUMMARY

This application provides a terminal device wakeup method and apparatus, a network device, and a terminal device, so as to ensure that the terminal device can wake up when required, thereby reducing or avoiding a problem of a data receiving and sending delay caused when the terminal device needs to wake up but does not wake up.

According to a first aspect, a terminal device wakeup method is provided and includes: A first terminal device receives configuration information of a first wakeup indication and configuration information of a second wakeup indication from a network device, where the first wakeup indication is used to indicate whether the first terminal device is to wake up, and the second wakeup indication is used to indicate whether at least one terminal device including the first terminal device is to wake up; and the first terminal device detects the first wakeup indication and the second wakeup indication based on the configuration information of the first wakeup indication and the configuration information of the second wakeup indication.

In the technical solution of this application, the network device configures the first wakeup indication and the second wakeup indication for the first terminal device, instead of only the first wakeup indication, where both the first wakeup indication and the second wakeup indication may be used to indicate whether the first terminal device is to wake up. The first terminal device may perform a subsequent operation by detecting the first wakeup indication and the second wakeup indication, so that an opportunity of waking up the first terminal device can be increased, thereby reducing or avoiding a problem of a data receiving and sending delay caused when a terminal device needs to wake up but does not wake up.

Specifically, both the first wakeup indication and the second wakeup indication may be used to indicate whether the first terminal device is to wake up. Regardless of whether the first terminal device detects the first wakeup indication or the second wakeup indication or both the first wakeup indication and the second wakeup indication, the first terminal device can perform a subsequent operation based on the indication of the network device. When one of the wakeup indications is not detected, the first terminal device may perform a corresponding behavior based on the other wakeup indication, instead of being not to wake up by default when no wakeup indication is detected. Therefore, the technical solution of this application can increase an opportunity of waking up the terminal device when the terminal device needs to wake up, and reduce or avoid a case in which the terminal device needs to wake up but does not wake up, thereby reducing or avoiding a problem of a data receiving and sending delay caused when the terminal device needs to wake up but does not wake up.

The case in which the terminal device needs to wake up but does not wake up may be that the network device sends a wakeup indication, but the terminal device does not correctly receive the wakeup indication due to channel quality deterioration or false detection or miss detection of the terminal device, and consequently, the terminal device does not wake up; or may be that the network device side does not send a wakeup indication due to insufficient time-frequency resources for sending the wakeup indication, blockage on the network device side, and the like, and consequently, the terminal device cannot receive the wakeup indication and does not wake up.

With reference to the first aspect, in a possible implementation, the method further includes: When the first terminal device detects the second wakeup indication but does not detect the first wakeup indication, the first terminal device determines, based on the second wakeup indication, whether to wake up.

The network device may send the first wakeup indication and the second wakeup indication, or send only the second wakeup indication to the first terminal device. When the network device sends the first wakeup indication and the second wakeup indication, the first terminal device may perform a subsequent operation based on the second wakeup indication even if the first wakeup indication is not detected, thereby avoiding a case in which the network device needs to wake up but does not wake up by default because the first wakeup indication is not detected.

With reference to the first aspect, in a possible implementation, the method further includes: When the first terminal device detects the second wakeup indication but does not detect the first wakeup indication, the first terminal device determines, based on the second wakeup indication, to wake up.

When the first terminal device does not detect the first wakeup indication, the first terminal device may determine, based on the second wakeup indication, to wake up, and this reduces or avoids a case in which the first terminal device needs to wake up but does not wake up by default because the first wakeup indication is not detected.

With reference to the first aspect, in a possible implementation, the method further includes: When the first terminal device detects the first wakeup indication and the second wakeup indication, the first terminal device determines, based on the first wakeup indication, whether to wake up.

With reference to the first aspect, in a possible implementation, the method further includes: When the first terminal device does not detect the first wakeup indication and the second wakeup indication, the first terminal device determines not to wake up.

With reference to the first aspect, in a possible implementation, the first wakeup indication is included on a first wakeup channel for the first terminal device, or is included on a first wakeup channel for a first group of terminal devices including the first terminal device.

It should be understood that, the first wakeup channel for the first terminal device may be understood as that the first wakeup channel corresponds to the first terminal device, and the first wakeup channel for the first group of terminal devices including the first terminal device may be understood as that the first wakeup channel corresponds to the first group of terminal devices.

With reference to the first aspect, in a possible implementation, the second wakeup indication is a second wakeup signal, or the second wakeup indication is included on a second wakeup channel for a second group of terminal devices including the first terminal device.

It should be understood that, the second wakeup channel for the second group of terminal devices including the first terminal device may be understood as that the second wakeup channel corresponds to the second group of terminal devices.

With reference to the first aspect, in a possible implementation, a quantity of terminal devices in the second group of terminal devices is greater than a quantity of terminal devices in the first group of terminal devices.

With reference to the first aspect, in a possible implementation, both the first wakeup indication and the second wakeup indication are located on a physical downlink control channel PDCCH.

With reference to the first aspect, in a possible implementation, a channel on which the first wakeup indication is located is a PDCCH, and the second wakeup indication is a first demodulation reference signal.

Optionally, the first demodulation reference signal is a wideband demodulation reference signal.

When the demodulation reference signal is a wideband demodulation reference signal, a frequency domain bandwidth occupied by the demodulation reference signal is greater than that occupied by a common downlink control information DCI, and a resource block is continuous in frequency domain. The demodulation reference signal is used to carry the second wakeup indication, so that the second wakeup indication can reuse an existing air interface resource, and resource overheads of the second wakeup indication are reduced. In addition, the demodulation reference signal provides better detection performance, and detection accuracy can be improved.

With reference to the first aspect, in a possible implementation, the first wakeup indication and the second wakeup indication are different demodulation reference signals.

With reference to the first aspect, in a possible implementation, the configuration information of the second wakeup indication includes transmission occasion information of the second wakeup indication.

With reference to the first aspect, in a possible implementation, the configuration information of the second wakeup indication includes a first scrambling code of the second wakeup indication, the first demodulation reference signal is scrambled by using the first scrambling code, a second demodulation reference signal is scrambled by using a second scrambling code, and the first scrambling code is different from the second scrambling code.

Optionally, the first scrambling code and the second scrambling code are orthogonal, so that the first demodulation reference signal and the second demodulation reference signal can implement orthogonal multiplexing without interference.

The first terminal device may determine, based on whether the demodulation reference signal exists or based on different scrambling codes, whether the second wakeup indication is sent.

With reference to the first aspect, in a possible implementation, the first wakeup indication and the second wakeup indication are used to indicate whether the first terminal device needs to detect, in a discontinuous reception DRX cycle, a PDCCH used to schedule data.

According to a second aspect, a terminal device wakeup method is provided and includes: A network device sends, to a first terminal device, configuration information of a first wakeup indication and configuration information of a second wakeup indication, where the first wakeup indication is used to indicate whether the first terminal device is to wake up, and the second wakeup indication is used to indicate whether at least one terminal device including the first terminal device is to wake up; and the network device sends the second wakeup indication to the first terminal device, or the network device sends the first wakeup indication and the second wakeup indication to the first terminal device.

In the technical solution of this application, the network device configures the first wakeup indication and the second wakeup indication for the first terminal device, instead of only the first wakeup indication, where both the first wakeup indication and the second wakeup indication may be used to indicate whether the first terminal device is to wake up. The first terminal device may perform a subsequent operation by detecting the first wakeup indication and the second wakeup indication, so that an opportunity of waking up the first terminal device can be increased, thereby reducing or avoiding a problem of a data receiving and sending delay caused when a terminal device needs to wake up but does not wake up.

With reference to the second aspect, in a possible implementation, that the network device sends the second wakeup indication to the first terminal device includes: When the network device needs to wake up the first terminal device, the network device sends the second wakeup indication to the first terminal device, where the second wakeup indication is used to indicate that the at least one terminal device is to wake up.

When the network device needs to send a plurality of first wakeup indications simultaneously within a time period, but lacks sufficient time-frequency resources for sending these first wakeup indications, the network device may send only one second wakeup indication, which is used to indicate that at least one terminal device is to wake up. This can resolve a problem that the network device side cannot send the wakeup indication to a plurality of terminal devices simultaneously due to a blockage problem, thereby reducing or avoiding a case in which these terminal devices need to wake up but cannot wake up because these terminal devices do not receive the wakeup indication sent by the network device, thereby avoiding a possibility of a delay in sending and receiving some data.

With reference to the second aspect, in a possible implementation, that the network device sends the first wakeup indication and the second wakeup indication to the first terminal device includes: When the network device needs to wake up the first terminal device, the network device sends the first wakeup indication and the second wakeup indication to the first terminal device, where the first wakeup indication is used to indicate that the first terminal device is to wake up, and the second wakeup indication is used to indicate that the at least one terminal device is to wake up, or is used to indicate that the at least one terminal device is not to wake up.

When the network device needs to wake up the first terminal device, the network device may send the first wakeup indication and the second wakeup indication, so as to indicate that the first terminal device is to wake up, thereby increasing an opportunity of waking up the first terminal device, and reducing or avoiding a case in which the first terminal device needs to wake up but cannot wake up, thereby avoiding a possibility of a delay in receiving and sending some data.

With reference to the second aspect, in a possible implementation, the at least one terminal device further includes a second terminal device, and that the network device sends the first wakeup indication and the second wakeup indication to the first terminal device includes: When the network device does not need to wake up the first terminal device but needs to wake up the second terminal device, the network device sends the first wakeup indication and the second wakeup indication to the first terminal device, where the first wakeup indication is used to indicate that the first terminal device is not to wake up, and the second wakeup indication is used to indicate that the at least one terminal device is to wake up.

The method further includes: When the network device does not need to wake up the first terminal device but needs to wake up the second terminal device, the network device sends the second wakeup indication to the second terminal device; or when the network device does not need to wake up the first terminal device but needs to wake up the second terminal device, the network device sends a third wakeup indication and the second wakeup indication to the second terminal device, where the third wakeup indication is used to indicate that the second terminal device is to wake up.

When the network device needs to wake up some terminal devices in a plurality of terminal devices, but does not need to wake up the other terminal devices, the network device sends a second wakeup indication for the plurality of terminal devices to indicate that the plurality of terminal devices are to wake up, and sends, to the terminal devices that do not need to wake up, a wakeup indication for the terminal devices that do not need to wake up. A priority of the wakeup indication for the terminal devices that do not need to wake up is also higher than that of the second wakeup indication, so that the terminal devices that need to wake up are to wake up, and the terminal devices that do not need to wake up are not to wake up.

With reference to the second aspect, in a possible implementation, the first wakeup indication is included on a first wakeup channel for the first terminal device, or is included on a first wakeup channel for a first group of terminal devices including the first terminal device.

With reference to the second aspect, in a possible implementation, the second wakeup indication is a second wakeup signal, or the second wakeup indication is included on a second wakeup channel for a second group of terminal devices including the first terminal device.

With reference to the second aspect, in a possible implementation, both the first wakeup indication and the second wakeup indication are located on a physical downlink control channel PDCCH.

With reference to the second aspect, in a possible implementation, a channel on which the first wakeup indication is located is a PDCCH, and the second wakeup indication is a first demodulation reference signal.

With reference to the second aspect, in a possible implementation, the configuration information of the second wakeup indication includes transmission occasion information of the second wakeup indication.

With reference to the second aspect, in a possible implementation, the configuration information of the second wakeup indication includes a first scrambling code of the second wakeup indication, the first demodulation reference signal is scrambled by using the first scrambling code, a second demodulation reference signal is scrambled by using a second scrambling code, and the first scrambling code is different from the second scrambling code.

With reference to the second aspect, in a possible implementation, the first wakeup indication and the second wakeup indication are used to indicate whether the first terminal device needs to detect, in a discontinuous reception DRX cycle, a PDCCH used to schedule data.

According to a third aspect, a terminal device wakeup method is provided and includes: A first terminal device receives configuration information of a first wakeup indication from a network device, where the first wakeup indication is used to indicate whether the first terminal device is to wake up; and the first terminal device detects the first wakeup indication based on the configuration information of the first wakeup indication.

With reference to the third aspect, in a possible implementation, the method further includes: When the first terminal device does not detect the first wakeup indication, the first terminal device determines to wake up.

That is, when the first terminal device does not detect the first wakeup indication, the first terminal device is to wake up by default, and this reduces or avoids a case in which the first terminal device needs to wake up but does not wake up by default because the first wakeup indication is not detected.

According to a fourth aspect, a terminal device is provided and includes a module or a unit configured to perform the method in any one of the first aspect or the possible implementations of the first aspect, or includes a module or a unit configured to perform the method in the third aspect.

According to a fifth aspect, a network device is provided and includes a module or a unit configured to perform the method in any one of the second aspect or the possible implementations of the second aspect.

According to a sixth aspect, a communications apparatus is provided, where the communications apparatus includes at least one processor and a communications interface, and the communications interface is configured to perform information exchange between the communications apparatus and another communications apparatus. When a program instruction is executed in the at least one processor, the communications apparatus is enabled to perform the method in any one of the first aspect or the possible implementations of the first aspect, or the communications apparatus is enabled to perform the method in the third aspect.

Optionally, the communications apparatus in the sixth aspect may be a terminal device, or may be a component (such as a chip or a circuit) used by the terminal device.

According to a seventh aspect, a communications apparatus is provided, where the communications apparatus includes at least one processor and a communications interface, and the communications interface is configured to perform information exchange between the communications apparatus and another communications apparatus. When a program instruction is executed in the at least one processor, the communications apparatus is enabled to perform the method in any one of the second aspect or the possible implementations of the second aspect.

Optionally, the communications apparatus in the seventh aspect may be a network device, or may be a component (such as a chip or a circuit) used by the network device.

According to an eighth aspect, a chip system is provided, where the chip system includes a processor used by a terminal device to implement a function in any one of the first aspect or the possible implementations of the first aspect, or used by a terminal device to implement a function in the third aspect, such as generating, receiving, sending, or processing data and/or information in the foregoing method. In a possible design, the chip system further includes a memory. The memory is configured to store a program instruction and data that are necessary for the terminal device. The chip system may include a chip, or may include a chip and another discrete device.

According to a ninth aspect, a chip system is provided. The chip system includes a processor used by a network device to implement a function in any one of the second aspect or the possible implementations of the second aspect, such as generating, receiving, sending, or processing data and/or information in the foregoing method. In a possible design, the chip system further includes a memory. The memory is configured to store a program instruction and data that are necessary for the network device. The chip system may include a chip, or may include a chip and another discrete device.

According to a tenth aspect, a computer-readable storage medium is provided, where the computer-readable storage medium stores an instruction, and when the instruction is run on a computer, the computer is enabled to perform the method in any one of the first aspect or the possible implementations of the first aspect, or the computer is enabled to perform the method in the third aspect.

According to an eleventh aspect, a computer-readable storage medium is provided, where the computer-readable storage medium stores an instruction, and when the instruction is run on a computer, the computer is enabled to perform the method in any one of the second aspect or the possible implementations of the second aspect.

According to a twelfth aspect, a computer program product including an instruction is provided, where when the computer program product is run on a computer, the computer is enabled to perform the method in any one of the first aspect or the possible implementations of the first aspect, or the computer is enabled to perform the method in the third aspect.

According to a thirteenth aspect, a computer program product including an instruction is provided, where when the computer program product is run on a computer, the computer is enabled to perform the method in any one of the second aspect or the possible implementations of the second aspect.

According to a fourteenth aspect, a communications system is provided, and includes the terminal device in the fourth aspect and the network device in the fifth aspect; or the communications system includes the communications apparatus in the sixth aspect and the communications apparatus in the seventh aspect.

DESCRIPTION OF EMBODIMENTS

Figure 1:
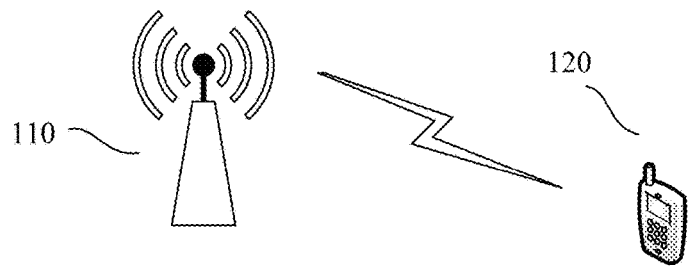
FIG. 1 is a schematic diagram of an application scenario according to an embodiment of this application.

The following describes technical solutions of this application with reference to the accompanying drawings.

The technical solutions in the embodiments of this application may be used for various communications systems, including but not limited to a long term evolution (long term evolution, LTE) system, an LTE frequency division duplex (Frequency Division Duplex, FDD) system, an LTE time division duplex (Time Division Duplex, TDD) system, an advanced long term evolution (advanced long term evolution, LTE-A) system, a worldwide interoperability for microwave access (Worldwide Interoperability for Microwave Access, WiMAX) communications system, a 5th generation (5th-generation, 5G) mobile communications system, a narrowband internet of things (narrow band internet of things, NB-IoT) system, an enhanced machine type communication (enhanced machine-type communication, eMTC) system, or an LTE machine-to-machine (LTE-machine-to-machine, LTE-M) system. The 5G mobile communications system may also be referred to as a new radio (new radio, NR) system.

The technical solutions in the embodiments of this application may be used for wireless communication between communications devices. Wireless communication may be performed between the communications devices by using an air interface resource. The communications device may include a network device and a terminal device, the network device may be further referred to as a network side device, and the terminal device may be further referred to as user equipment (user equipment, UE). The air interface resource may include at least one of a time domain resource, a frequency domain resource, a code resource, and a space resource. In the embodiments of this application, "at least one" may be further described as one or more, and "a plurality of" may be two, three, four, or more. This is not limited in this application. It should be noted that, in the embodiments of this application, the term "wireless communication" may be further referred to as "communication" for short, and the term "communication" may be further described as "data transmission", "signal transmission", "information transmission", "transmission", or the like. In the embodiments of this application, transmission may include sending or receiving. For example, transmission may be uplink transmission. For example, the terminal device may send a signal to the network device. Transmission may alternatively be downlink transmission. For example, the network device may send a signal to the terminal device.

For ease of understanding, the following first describes several concepts in this application.

Physical downlink control channel (physical downlink control channel, PDCCH): The PDCCH is used to carry downlink control information (downlink control information, DCI). Information transmitted on the physical downlink control channel may include common control information (such as scheduling information of system information and scheduling information of paging (paging) information) and user-specific information (such as a downlink resource allocation indication, an uplink scheduling grant (uplink grant, UL grant), an uplink power control parameter, and uplink retransmission information).

Downlink control information (downlink control information, DCI) has a plurality of formats (format). Different DCI formats may be used to indicate different control information, for example, DCI used to schedule data (including uplink data from a terminal device and downlink data to a terminal device), DCI used to indicate a slot format, and DCI used to indicate interrupted transmission (interrupted transmission). A resource granularity of a PDCCH is a control channel element (control channel element, CCE). Each CCE includes six resource element groups (resource element group, REG), and each REG includes 12 resource elements (resource element, RE). That is, one CCE is a continuous resource block that includes 72 REs. A system may allocate, based on channel quality, 1/2/4/8 logically consecutive CCEs to transmit each piece of DCI; and 1, 2, 4, and 8 CCEs may be referred to as an aggregation level (aggregation level, AL), that is, a quantity of CCEs that form one PDCCH channel.

Blind detection (blind detect, BD): A PDCCH is an instruction sent by a network device, and a terminal device may be configured to detect a plurality of DCI formats. However, the network device does not always transmit all configured DCI formats to the terminal. In addition, for possible time-frequency resources for sending a PDCCH, there are also a plurality of possible time-frequency resource sets that may be used to send the PDCCH. However, the network device selects only one of the time-frequency resources to send a specific PDCCH. Therefore, the terminal cannot accurately know a PDCCH format actually sent by a base station and a time-frequency resource actually used for sending. Therefore, detection on the PDCCH belongs to blind detection. The terminal device expects to obtain a certain DCI based on a status of the terminal device. For different expectation information, the terminal device uses a corresponding radio network temporary identifier (radio network temporary identity, RNTI) to perform cyclic redundancy check (cyclic redundancy check, CRC) on the DCI. If CRC check succeeds, the terminal device knows that this information is sent by the network to the terminal, and further parses content carried in the DCI.

PDCCH candidate (PDCCH candidate): A PDCCH candidate corresponds to a possible PDCCH sending time-frequency resource, and one PDCCH candidate corresponds to aggregation of aggregation level (aggregation level, AL) CCEs. There may be a plurality of PDCCH candidates in one control resource set (control resource set, CORESET). For example, if a CORESET control area includes 32 CCEs, the CORESET may include eight PDCCH candidates whose aggregation level is 4, four PDCCH candidates whose aggregation level is 8, and two PDCCH candidates whose aggregation level is 16. Different PDCCH candidates may have overlapping CCE resources.

Search space set: One search space corresponds to a set of a plurality of PDCCH candidates that are detected by UE and that have a same aggregation level (AL), and the search space set is aggregation of search spaces corresponding to one or more aggregation levels. In a communications protocol, available CCEs are divided into two types of search spaces to improve blind detection efficiency of the terminal device, which are respectively a common search space (common search space) and a UE-specific search space (UE-specific search space), and different information is searched in different spaces. Data transmitted in the common search space mainly includes scheduling DCI of system information, scheduling DCI of a random access response (random access response, RAR), scheduling DCI of a paging message, and the like. Each user needs to search the common search space. For the UE-specific search space, a search start point of each UE is different, and a space size is related to an AL. A search space is defined for a CCE aggregation level, and one UE may have a plurality of search spaces. When performing searching, the UE usually does not know an aggregation level of a CCE occupied by a PDCCH. Therefore, the UE tries all configuration possibilities. An aggregation level corresponding to the search space set may be configured by a base station, and may be configured from aggregation levels of 1, 2, 4, 8, and 16.

Therefore, blind detection by the terminal device is an operation in which the UE terminal performs demodulation and decoding on all PDCCH candidates in a corresponding search space set, and performs CRC check on a decoded bit according to a preset rule. Specifically, the network configures different RNTIs for the terminal based on different DCI, and performs an exclusive OR masking operation on the RNTIs and all or a part of CRC bits according to a preset rule. If the terminal device checks, based on a target RNTI, CRC in DCI decoded through blind detection, and the check succeeds, the terminal device detects the PDCCH, and considers that the DCI carried on the PDCCH is to be sent to the terminal.

Idle state (IDLE state): After UE completes camping in a cell, the UE may be considered as entering an "idle state" or an "IDLE state", and a radio resource control (radio resource control, RRC) connection of the UE in the idle state is not established. Therefore, the UE may be referred to as UE in an RRC idle state.

Connected state (CONNECTED state): If the UE subsequently completes a random access process and establishes an RRC connection to a network (base station), the UE may be considered as entering a "connected state" or a "CON- NECTED state", and the RRC connection of the UE in the connected state is established. Therefore, the UE may be referred to as UE in an RRC connected state.

Discontinuous reception (discontinuous reception, DRX) mechanism: This mechanism is defined in media access control (media access control, MAC) of a physical layer. The DRX mechanism may enable UE to periodically enter a sleep mode (sleep mode) at some times (which may be defined as an inactive time (inactive time)) without monitoring a PDCCH that is masked by using a specified cell radio network temporary identifier (cell radio network temporary identity, C-RNTI). When needing to monitor the PDCCH (the time may be defined as an active time (active time)), the UE wakes up (wake up) from the sleep mode and monitors these PDCCHs, so that power consumption of the UE can be reduced. For example, for NR, in a connected DRX mechanism (C-DRX for short), the following information does not need to be monitored: DCI masked by using a cell radio network temporary identifier (cell radio network temporary identity, C-RNTI), a configured scheduling radio network temporary identifier (configured scheduling RNTI, CS-RNTI), an interruption RNTI (interruption RNTI, INT-RNTI), a slot format indicator RNTI (slot format indicator RNTI, SFI-RNTI), a semi-persistent channel state information RNTI (semi-persistent channel state information RNTI, SP-CSI-RNTI), a physical uplink control channel (physical uplink control channel, PUCCH) transmit power control RNTI (transmit power control PUCCH RNTI, TPC-PUCCH-RNTI), a physical uplink shared channel (physical uplink shared channel, PUSCH) transmit power control RNTI (transmit power control PUSCH RNTI, TPC-PUSCH-RNTI), and a sounding reference signal (sounding reference signal, SRS) transmit power control RNTI (transmit power control RNTI, TPC-SRS-RNTI), but the DCI masked by using these RNTIs needs to be monitored in the active time. For an NR system, sending of DCI masked by using a system information RNTI (system information RNTI, SI-RNTI), a paging RNTI (paging RNTI, P-RNTI), a random access RNRI (random access RNTI, RA-RNTI), and a temporary cell radio network temporary identifier (temporary cell radio network temporary identity, TC-RNTI) is not affected by the C-DRX mechanism. Based on a status of the UE, if the DRX mechanism is configured, the DRX mechanism may be divided into an idle state DRX (Idle-DRX) and a connected state DRX (Connected-DRX, C-DRX for short).

Discontinuous reception cycle (discontinuous reception cycle, DRX cycle): This cycle is also referred to as a DRX cycle, and is a basic time unit in a DRX state. A length of the DRX cycle is referred to as a DRX cycle. The DRX cycle is divided into outside active time (also referred to as an inactive time) and an active period (also referred to as an active time) based on a behavior of the UE.

A status of UE in outside active time (out of active time) may be referred to as a sleep state (sleep, also referred to as DRX_OFF) in this application. The UE in the sleep state may choose to disable, based on implementation, communications components such as a radio frequency transceiver (or a receiver) and a baseband processor to reduce power consumption, or although a radio frequency component is enabled, only some monitoring and detection processes with relatively low power consumption are performed, to monitor, for example, some messages that the UE needs to monitor, such as a paging message, a broadcast message, and a system message. It should be noted that the UE in the inactive time does not receive one type of DCI on the PDCCH, for example, DCI used to schedule data, but may receive other DCI on the PDCCH that is not affected by whether the UE is in the active time, and receive data from another physical channel, for example, a physical downlink shared channel (physical downlink shared channel, PDSCH), an acknowledgment (acknowledgment, ACK) message, or a negative-acknowledgment (negative-acknowledgment, NACK). For example, for NR, in the C-DRX mechanism, the DCI masked by using the C-RNTI, the CS-RNTI, the INT-RNTI, the SFI-RNTI, the SP-CSI-RNTI, the TPC-PUCCH-RNTI, the TPC-PUSCH-RNTI, and the TPC-SRS-RNTI within the inactive time does not need to be monitored, while the DCI masked by using these RNTIs needs to be monitored during the active time. For the NR system, sending of the DCI masked by using the SI-RNTI, the P-RNTI, the RA-RNTI, and the TC-RNTI is not affected by the C-DRX mechanism.

In this application, a status of UE in the active period may be referred to as a wakeup state (wake up, also referred to as DRX_ON). When a DRX cycle enters the active time, the UE is to wake up and monitor and receive a PDCCH. Therefore, in the embodiments of this application, the wakeup state is referred to as an active state.

In another example in this application, when UE is in the active time, the UE is to wake up and monitor and receive a PDCCH of a preset type, for example, receive DCI used to schedule user data, or receive DCI masked by using a C-RNTI, a CS-RNTI, an INT-RNTI, an SFI-RNTI, an SP-CSI-RNTI, a TPC-PUCCH-RNTI, a TPC-PUSCH-RNTI, and a TPC-SRS-RNTI.

In the connected DRX working mode, UE cannot always be in the sleep state or cannot always skip monitoring a PDCCH of a preset type. The UE needs to periodically enable a radio frequency transceiver to enter an active window, and continuously monitor, in a subsequent time period, the PDCCH of the preset type that may be sent. This time period is referred to as DRX on duration (on duration), and is controlled by an on duration timer (on duration timer). Generally, the on duration is a fixed time period, and may be preconfigured. In the embodiments of this application, a time period in which the UE can monitor a PDCCH channel is referred to as an active time (or an active period). Within the active time, the UE enables the radio frequency transceiver and monitors the PDCCH of the preset type. The active time includes the on duration, and may also include a time period in which another DRX-related timer runs (for example, an inactivity timer (inactivity timer) and a retransmission timer (retransmission timer)). It should be noted that, generally, it is not the case that the UE wakes up only when the on duration arrives, but wakes up first within a time period before the on duration arrives, and receives a downlink reference signal to perform time-frequency offset synchronization first, so as to prevent a clock and a working frequency of a system of the UE from deviating from a clock and a frequency domain of the base station due to a long-time sleep. In addition, the UE may also first attempt to receive a downlink synchronization signal and an update system message, so as to prevent a deviation of a system message after the UE moves from one cell to another.

Wakeup indication (wake-up indication): is indication information used to reduce power consumption of UE that is configured with a DRX cycle. When a network device considers that a PDCCH of a preset type needs to be sent to the UE in on duration (for example, scheduling DCI), the network device first sends a wakeup indication to the UE at a time or within a time period in an inactive time before the on duration, so as to notify the UE that there is DCI (for example, DCI used to schedule data) that needs to be sent to the UE in the subsequent on duration; or notify the UE whether the UE needs to enable an on duration timer, so that the UE wakes up in the on duration and monitors the PDCCH of the preset type (for example, DCI for scheduling uplink and downlink data). If the UE does not detect the wakeup indication, the UE considers that there is no DCI of the preset type that is to be sent to the UE in the on duration. For example, the UE considers that the base station will not send scheduling DCI to the UE in the on duration, and the UE will not wake up in the on duration. Alternatively, if the UE does not detect the wakeup indication, the UE will not enable the on duration timer. Because the on duration timer is not enabled, the terminal will not detect the PDCCH of the preset type (for example, the UE will not monitor the scheduling DCI) in the corresponding DRX cycle.

It should be noted that, for ease of understanding, in the embodiments of this application, when the DRX mechanism is described, for example, whether the UE monitors a PDCCH is used to describe a terminal behavior of the UE in the active time and the inactive time. However, it should be understood that, whether the UE monitors the PDCCH actually refers to whether the UE monitors the PDCCH of the preset type. Without loss of generality, whether the UE monitors DCI used to schedule data (referred to as scheduling DCI) is used as an example for description in the embodiments of this application. However, it should be understood that the embodiments of this application are not limited thereto. For example, in an NR system, DCI of a preset type includes DCI masked by using a C-RNTI, a CS-RNTI, an INT-RNTI, an SFI-RNTI, an SP-CSI-RNTI, a TPC-PUCCH-RNTI, a TPC-PUSCH-RNTI, and a TPC-SRS-RNTI.

FIG. 1 is a schematic diagram of an application scenario according to an embodiment of this application. As shown in FIG. 1, the application scenario may include a network device 110 and a terminal device 120.

The network device 110 may be a device configured to communicate with the terminal device 120. For example, the network device 110 may be a base station configured to enable the terminal device 120 to access a radio access network (radio access network, RAN). For ease of understanding, in this embodiment of this application that the network device 110 is a base station is used as an example for description. The base station may sometimes be referred to as an access network device or an access network node. It may be understood that in systems using different radio access technologies, names of devices that have functions of a base station may vary. For ease of description, in this embodiment of this application, apparatuses that provide a wireless communication function for the terminal are collectively referred to as a base station. For example, the network device 110 may be an evolved NodeB (evolved node B, eNB) in long term evolution (long term evolution, LTE), a next generation node base station (next generation node base station, gNB) in a 5th generation (the fifth generation, 5G) system, a transmission and reception point (transmission and reception point, TRP), a network device in a 5G network, or the like. The network device 110 may be in a plurality of forms, such as a macro base station, a micro base station, a relay node, and an access point. Coverage of one network device 110 may include one cell, or may include a plurality of cells. In this embodiment of this application, an apparatus for implementing a function of the network device may be a network device, or may be an apparatus that can support the network device in implementing the function, such as a chip system. In the technical solution of this embodiment of this application, an example in which the apparatus for implementing the function of the network device is a network device and the network device is a base station is used to describe the technical solution provided in this embodiment of this application.

The terminal device 120 may communicate with one or more core networks (core network, CN) by using an access network device. The terminal device 120 may be a device that has a wireless transmission/reception function. The terminal device 120 may be deployed on land, and include an indoor device, an outdoor device, a hand-held device, or a vehicle-mounted device; or may be deployed on the water (for example, on a ship); or may be deployed in the air (for example, on a plane, a balloon, or a satellite). The terminal device 120 may also be referred to as UE, an access terminal, a terminal, a subscriber unit, a subscriber station, a mobile station, a mobile console, a remote station, a remote terminal, a mobile device, a user terminal, a radio network device, a user agent or a user apparatus. The terminal device 120 may be a cellular phone (cellular phone), a cordless phone, a session initiation protocol (Session Initiation Protocol, SIP) phone, a smartphone (smartphone), a wireless local loop (Wireless Local Loop, WLL) station, a personal digital assistant (Personal Digital Assistant, PDA), a handheld device having a wireless communication function, a computing device, another device connected to a wireless modem, an vehicle-mounted device, a wearable device, an unmanned aerial vehicle, a terminal in the internet of things or the internet of vehicles, any form of terminal in a future network, relay user equipment, a terminal in a future evolved public land mobile network (public land mobile network, PLMN), or the like. This is not limited in the embodiments of this application. For example, the terminal device 120 may be a virtual reality (virtual reality, VR) terminal device, an augmented reality (augmented reality, AR) terminal device, a terminal device in industrial control, a terminal device in self-driving, a terminal device in telemedicine, a terminal device in a smart grid, a terminal device in a smart city (smart city), or a terminal device in a smart home (smart home). In this embodiment of this application, an apparatus for implementing a function of the terminal device may be a terminal device, or may be an apparatus that can support the terminal device in implementing the function, such as a chip system. In this embodiment of this application, the chip system may include a chip, or may include a chip and another discrete device. In the technical solution of this embodiment of this application, an example in which the apparatus for implementing the function of the terminal device is a terminal device and the terminal device is UE is used to describe the technical solution provided in this embodiment of this application.

The network device 110 and the terminal device 120 may perform uplink and downlink signal transmission by using a transmission link between the network device 110 and the terminal device 120. A transmission link from the network device 110 to the terminal device 120 may be referred to as a downlink (downlink), and a transmission link from the terminal device 120 to the network device 110 may be referred to as an uplink (uplink). When there is data that needs to be transmitted between the network device 110 and the terminal device 120, the terminal device 120 monitors a physical downlink control channel PDCCH sent over the downlink, and transmits and receives data based on an indication message sent by the network device 110. The terminal device 120 does not always perform an upload or a download service, and the terminal device 120 does not exchange data with the network for most of the time. Therefore, if the terminal device 120 continuously monitors a PDCCH in this case, it clearly consumes much electricity.

Figure 2:
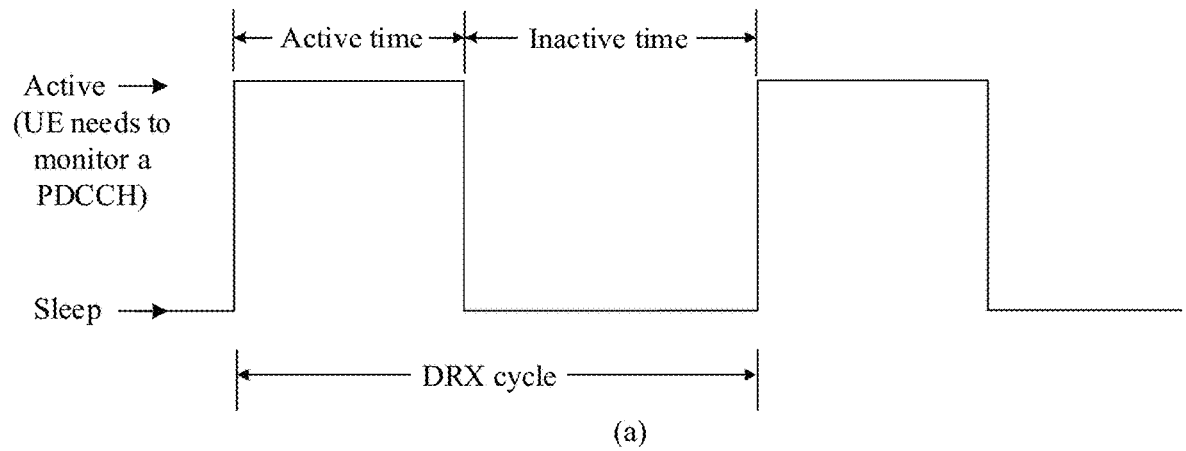
FIG. 2 is a schematic diagram of a status of a terminal device in a DRX mode according to an embodiment of this application.
Figure 2:
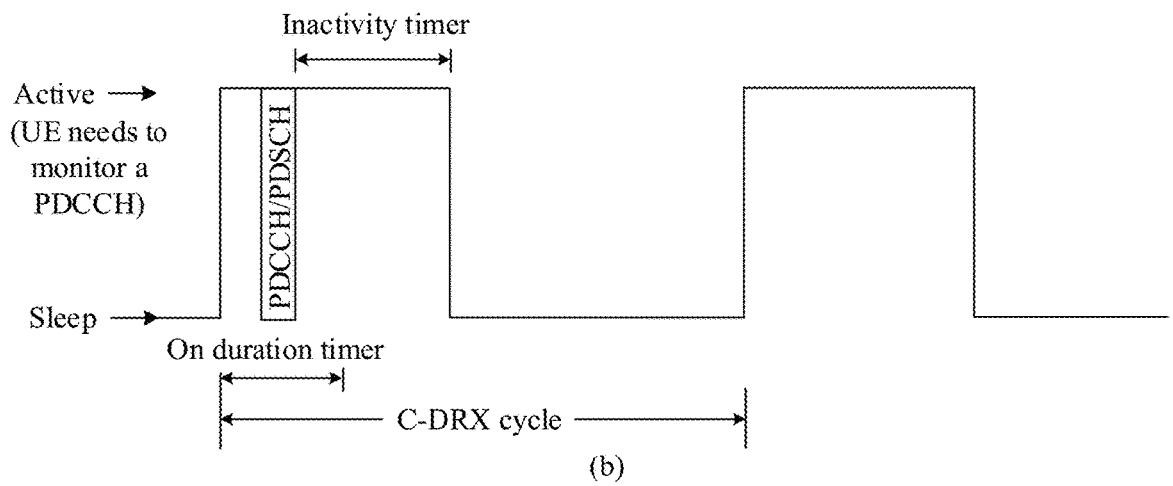

Therefore, on the premise that data can be effectively transmitted, a discontinuous reception (discontinuous reception, DRX) cycle may be configured for UE in a connected state, so that only in a necessary time period, the UE enables a receiver (for example, an antenna) to enter an active state to monitor the PDCCH, and disables the receiver to enter an inactive state in a remaining time period and does not monitor the PDCCH. FIG. 2 shows a schematic diagram of a status of a terminal device in a DRX mode.

As shown in (a) of FIG. 2, a DRX cycle includes an active time (active time) (for ease of description, for example, the active time shown in (a) of FIG. 2 is equal to on duration) and an inactive time (inactive time). The UE needs to wake up in the active time and monitor a PDCCH, the UE is in an active state (a wakeup state) within the active time, and the UE is in an inactive state (a sleep state) within the inactive time. A DRX working mechanism in an RRC connected state is a working manner in which a timer is combined with a DRX cycle. For example, within on duration in the connected state, if the UE monitors a PDCCH for scheduling new data, the UE enables an inactivity timer, and continuously monitors the PDCCH in a next time period. In a valid time period of the inactivity timer (that is, a working time period of the inactivity timer), once the UE receives scheduling DCI sent to the UE by using the PDCCH, the UE re-enables the inactivity timer, and continues to continuously monitor the PDCCH in the valid time period of the inactivity timer. If the UE does not receive, within a time period, the scheduling DCI sent to the UE, and the inactivity timer expires, the UE enters the inactive time, and does not monitor a PDCCH of a preset type. When the network device does not configure a wakeup indication for the UE, after a time period, the DRX cycle ends, and the UE enters a next DRX cycle. As shown in (b) of FIG. 2, at a start point of a next DRX cycle, the UE re-enables an on duration timer, and monitors the PDCCH during the on duration (that is, a working period of the on duration timer) and attempts to blindly detect downlink DCI. If no scheduling DCI sent to the UE is detected within a valid time period of the on duration timer (that is, the working period of the on duration timer), the UE re-enters the inactive time (that is, re-enters the inactive state) after the on duration process ends. If scheduling DCI for scheduling new data transmission that is sent to the UE is received within the valid time period of the on duration timer, the UE enables the inactivity timer starting from a next symbol or a next slot (slot) after a symbol in which a PDCCH of the scheduling DCI is located (or may be understood as completing blind DCI detection on the PDCCH), and continuously monitors the PDCCH within a valid time period of the on duration timer or the inactivity timer. If the UE does not receive, within the valid time period of the on duration timer and the inactivity timer, the scheduling DCI sent to the UE, and the inactivity timer expires, the UE re-enters the inactive time. If the scheduling DCI for scheduling new data transmission that is sent to the UE is received within the valid time period of the on duration timer, the UE enables the inactivity timer for calculation, and continuously monitors the PDCCH within the valid time period of the on duration timer or the inactivity timer. If the UE receives again, within the valid time period of the on duration timer and the inactivity timer, the scheduling DCI for scheduling new data transmission that is sent to the UE, the UE re-enables the inactivity timer, and still continuously monitors the PDCCH within the valid time period of the on duration timer or the inactivity timer, until the UE does not receive, within the valid time period of the on duration timer and the inactivity timer, the scheduling DCI sent to the UE, and the inactivity timer expires; and the UE re-enters the inactive time.

It should be noted that, in this embodiment of this application, re-enabling of the inactivity timer is for scheduling of initially transmitted data of the UE, instead of retransmission.

Therefore, in the DRX mechanism, the UE implements power saving mainly by sleeping in the inactive state or skipping monitoring a PDCCH of a preset type. In the inactive time, the UE may choose, based on implementation, to disable a radio frequency transmitter/receiver and disable a baseband processing chip and a memory, or reserve only a crystal oscillator and a clock or the like. The foregoing mentioned DCI transmitted on the PDCCH may have different formats. Therefore, a PDCCH configured for the UE by the network device may have a plurality of different types. UE configured with DRX detects only one type of DCI (that is, the preset type of DCI) only in the active time, and does not detect this type of DCI in the inactive time. This type of DCI may include DCI masked by using a C-RNTI, a CS-RNTI, an INT-RNTI, an SFI-RNTI, an SP-CSI-RNTI, a TPC-PUCCH-RNTI, a TPC-PUSCH-RNTI, and a TPC-SRS-RNTI. The UE needs to detect other DCI regardless of whether the UE is in the active time or the inactive time, and this is not affected by the DRX mechanism. For ease of understanding, this embodiment of this application uses an example in which the UE configured with DRX blindly detects, in the active time, scheduling DCI sent to the UE. However, it should be understood that the method in this embodiment of this application is also applicable to other DCI in this type of DCI.

Figure 3:
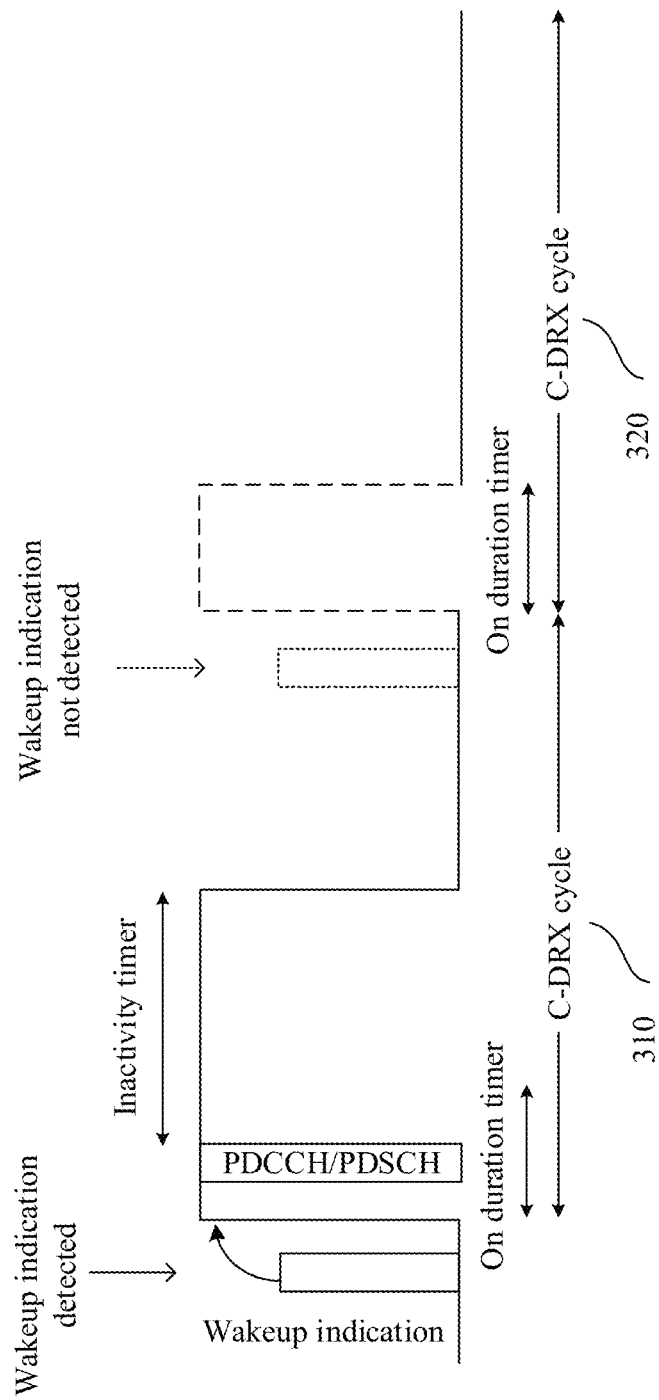
FIG. 3 is a schematic diagram of a status of a terminal device in a DRX mode configured with a wakeup indication according to an embodiment of this application.

In most cases, the network device does not send scheduling DCI to the UE in the active time in all DRX cycles. However, the UE still needs to continuously monitor the PDCCH in the active time in all the DRX cycles, and continuously attempt to blindly detect whether there is scheduling DCI to be sent to the UE. Such a blind detection operation actually still occupies much power consumption of the UE. To further reduce power consumption of the UE, a PDCCH-based wakeup indication is introduced into the DRX mechanism. With reference to FIG. 3, the following describes in detail a status and a behavior of the UE in the DRX mechanism in which the wakeup indication is configured.

The PDCCH-based wakeup indication may be understood as that the wakeup indication is carried on the PDCCH for sending. For example, the PDCCH-based wakeup indication may be information in a bit or a bit field in DCI carried on the PDCCH. For example, FIG. 3 shows two DRX cycles, that is, a first DRX cycle 310 and a second DRX cycle 320. A transmission occasion of a wakeup indication is before UE enters an active time and a search space of a PDCCH on which the wakeup indication is located is in an inactive time in a DRX cycle, or a sending time of a wakeup indication is within a start time period of on duration of a corresponding DRX cycle. When the network considers that scheduling DCI sent to the UE in the on duration of the active time corresponding to the wakeup indication is used to schedule data transmission to the UE, the network device sends the wakeup indication to the UE on a PDCCH on which the wakeup indication is located. In other words, when the UE needs to be scheduled to send or receive data in the on duration, and the scheduling DCI is sent to the UE in the on duration, the network device sends the wakeup indication before the on duration arrives or within the start time period of the on duration. For the UE, if the network device configures a wakeup indication, the UE may detect, on a preset time-frequency resource before an on duration of a DRX cycle arrives or within the start time period of the on duration, the wakeup indication sent by using the PDCCH. If the UE detects the wakeup indication, it indicates that the UE needs to monitor the PDCCH in the on duration corresponding to the wakeup indication so as to detect scheduling DCI, and send or receive data according to the indication of the scheduling DCI. For example, if the network device needs to send scheduling DCI to the UE within the on duration of the first DRX cycle 310 to schedule data to the UE, the network device sends a wakeup indication before the on duration of the first DRX cycle 310. Correspondingly, after detecting the wakeup indication, the UE wakes up and enables an on duration timer simultaneously in the on duration of the first DRX cycle 310. The UE blindly detects and receives the scheduling DCI on the PDCCH, and enables or re-enables an inactivity timer after receiving the scheduling DCI. If the UE does not receive, within a valid time period of the inactivity timer, scheduling DCI sent to the UE, the UE enters the inactive state after the inactivity timer expires. The network device does not need to schedule the UE to send or receive data during on duration of the second DRX cycle 320, and the network device may not send a wakeup indication before the on duration of the second DRX cycle 320. Correspondingly, if the UE does not detect a wakeup indication before the on duration of the second DRX cycle 320, the UE may not wake up during the on duration of the second DRX cycle 320, that is, the UE does not need to detect scheduling DCI to achieve power saving.

It should be understood that there may be an association relationship between a wakeup indication sent by the network device and a DRX cycle (or on duration in the DRX cycle) in which the wakeup indication is used to indicate that the UE is to wake up, and the association relationship may be a one-to-one correspondence, or may be a one-to-multiple or multiple-to-one correspondence.

In some cases, the network device needs to wake up the UE. However, because of limited resources, the network device cannot send the wakeup indication to the UE or the UE does not detect the wakeup indication, and the UE considers that no data scheduling exists in a corresponding DRX cycle. Therefore, the UE is not to wake up in on duration of the DRX cycle and detect scheduling DCI, causing the UE to miss a scheduling opportunity of one DRX cycle, and increasing a data receiving and sending delay. For example, in some cases, the network device sends a wakeup indication, but because the UE fails to detect the wakeup indication due to a reason such as miss detection or false detection by the UE, the UE is not to wake up in on duration of a DRX cycle corresponding to the wakeup indication. In some other cases, if a PDCCH used to send a wakeup indication to the UE and a PDCCH used for another purpose (for example, data scheduling, a user group transmission format indication, power control, or a system information change indication) share a same search space or the network device needs to send a wakeup indication to a plurality of UEs at a same moment, the network device may not have sufficient downlink resources used to send the wakeup indication, that is, blockage (blockage) occurs on the network device. In this case, the network device cannot send the wakeup indication to the UE, and consequently, the UE cannot successfully detect the wakeup indication, and the UE is not to wake up in on duration of a DRX cycle corresponding to the wakeup indication.

Therefore, a terminal device wakeup method needs to be provided, so as to ensure that when required, the terminal device can receive a wakeup indication, so as to reduce or avoid a case in which the network device needs to wake up the terminal device but cannot send the wakeup indication, and a resulted problem of a data receiving and sending delay. The following describes the embodiment of this application in detail with reference to FIG. 4.

Figure 4:
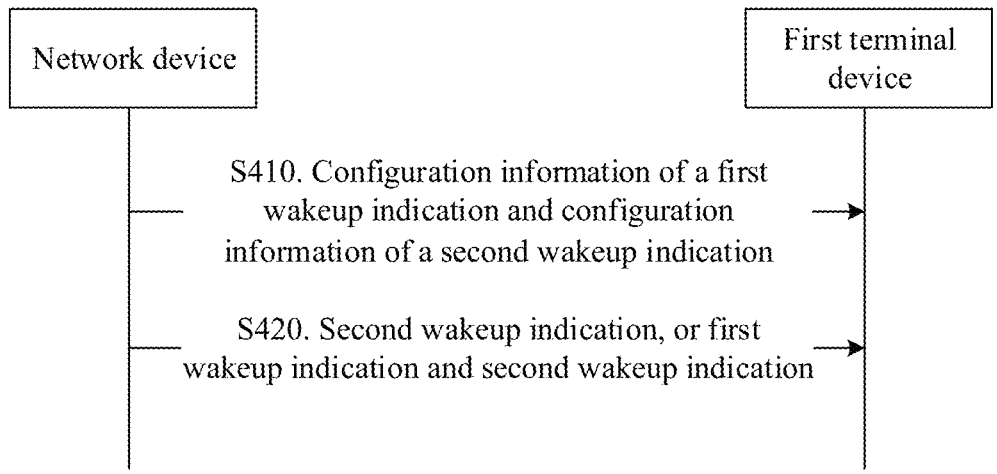
FIG. 4 is a schematic flowchart of a terminal device wakeup method according to an embodiment of this application.

FIG. 4 is a schematic flowchart of a terminal device wakeup method according to an embodiment of this application. The method may be executed by a network device and a first terminal device. The network device may be, for example, the network device 110 in FIG. 1, and the first terminal device may be, for example, the terminal device 120 in FIG. 1. The method includes steps S410 and S420.

In step S410, the network device sends configuration information of a first wakeup indication and configuration information of a second wakeup indication to the first terminal device. Correspondingly, the first terminal device receives the configuration information of the first wakeup indication and the configuration information of the second wakeup indication from the network device.

In this embodiment of this application, the first wakeup indication is a wakeup indication for the first terminal device.

That the first wakeup indication is a wakeup indication for the first terminal device may be understood as that the first wakeup indication corresponds to the first terminal device, and the first wakeup indication is used to indicate whether the first terminal device is to wake up.

There are a plurality of forms of the first wakeup indication.

For example, the first wakeup indication may be included on a first wakeup channel for the first terminal device. The first wakeup channel for the first terminal device corresponds to the first terminal device, that is, the first wakeup channel for the first terminal device is dedicated to carrying the first wakeup indication.

Optionally, the first wakeup channel may be a physical downlink control channel PDCCH.

Optionally, the first wakeup indication may be information about one or more bits in downlink control information DCI carried on the first wakeup channel PDCCH. For example, that a bit in the DCI is set to 1 may indicate that the first terminal device needs to wake up, and that the bit is set to 0 may indicate that the first terminal device does not need to wake up. Correspondingly, the first terminal device is to wake up if detecting that the bit used to represent the first wakeup indication is set to 1, and is not to wake up if detecting that the bit used to represent the first wakeup indication is set to 0.

In some possible implementations, alternatively, the network device may send the first wakeup indication to indicate that the first terminal device needs to wake up, and skip sending the first wakeup indication to indicate that the first terminal device does not need to wake up. Correspondingly, the first terminal device is to wake up if receiving the first wakeup indication, and is not to wake up if the first terminal device does not receive the first wakeup indication.

Optionally, correspondingly, the configuration information of the first wakeup indication may include configuration information of a control resource set (also referred to as a control resource set) in which the first wakeup channel PDCCH is located and configuration information of a search space of the first wakeup channel PDCCH. A time-frequency resource location of the first wakeup channel for the first terminal device may be defined by using the configuration information of the control resource set and the configuration information of the search space. Optionally, the configuration information of the first wakeup indication may further include an RNTI corresponding to the first wakeup channel corresponding to the first terminal device, a user equipment identification (user equipment identification, UE ID) of the first terminal device, and the like.

For another example, the first wakeup indication may be included on a first wakeup channel for a first group of terminal devices including the first terminal device. The first wakeup channel for the first group of terminal devices including the first terminal device corresponds to the first group of terminal devices, that is, the first wakeup channel for the first group of terminal devices including the first terminal device is used to carry wakeup indications of the first group of terminal devices.

Optionally, the first wakeup channel may be a physical downlink control channel PDCCH.

Optionally, the first wakeup indication may be information about a bit in downlink control information DCI carried on the PDCCH, and the first wakeup channel includes a wakeup indication corresponding to each terminal device in the first group of terminal devices. In other words, the first wakeup channel PDCCH may include one piece of DCI. A plurality of pieces of different bit location information in the DCI correspond to wakeup indications of different terminals in the first group of terminal devices. The plurality of pieces of different bit location information in the DCI may be in a one-to-one correspondence with a plurality of terminal devices in the first group of terminal devices. A piece of bit location information in the DCI is the wakeup indication (that is, the first wakeup indication) of the first terminal device. In other words, the first wakeup channel PDCCH carries DCI for the first group of terminal devices, a plurality of different bit field locations in the DCI correspond to wakeup indications of all terminal devices in the first group of terminal devices, one bit field location in the DCI corresponds to the wakeup indication of the first terminal device, and information carried in the bit field location in the DCI may be the first wakeup indication, and is used to indicate whether the first terminal device is to wake up. A manner in which the first wakeup indication indicates whether the first terminal device is to wake up may be similar to a manner used "when the first wakeup indication is included on the first wakeup channel for the first terminal device". For brevity, details are not described herein again.

Because one piece of DCI bit information on the first wakeup channel corresponds to the first wakeup indication of the first terminal device, optionally, in addition to the configuration information of the first wakeup indication existing "when the first wakeup indication is included on the first wakeup channel for the first terminal device", the configuration information of the first wakeup indication further needs to include a bit field location, in the DCI, corresponding to the first wakeup indication of the first terminal device.

Optionally, the first wakeup indication may be information in a bit field in downlink control information DCI, and the downlink control information DCI includes a bit field corresponding to each terminal device in the first group of terminal devices. In other words, the first wakeup channel PDCCH may include at least one piece of DCI. A piece of DCI in the at least one piece of DCI is wakeup indications for the first group of terminal devices. The DCI may include a plurality of bit fields. The plurality of bit fields correspond to all terminal devices in the first group of terminal devices. Information in the plurality of bit fields is used to indicate whether a corresponding terminal device is to wake up. A bit field in the plurality of bit fields corresponds to the first terminal device. Information in a bit field in the plurality of bit fields is the wakeup indication (that is, the first wakeup indication) of the first terminal device. In other words, a piece of DCI on the first wakeup channel carries wakeup indications of the first group of terminal devices. For example, the DCI may include a plurality of bit fields, and information in one bit field may indicate whether one terminal device in the first group of terminal devices is to wake up.

Optionally, correspondingly, the configuration information of the first wakeup indication may include configuration information of a control resource set in which the first wakeup channel PDCCH is located and configuration information of a search space of the first wakeup channel PDCCH. A time-frequency resource location of the first wakeup channel for the first group of terminal devices including the first terminal device may be defined by using the configuration information of the control resource set and the configuration information of the search space. Optionally, the configuration information of the first wakeup indication may further include an RNTI corresponding to DCI, for the first group of terminal devices, on the first wakeup channel, a UE ID of another terminal device in the first group of terminal devices, or the like. Optionally, the configuration information of the first wakeup indication further needs to include a bit field location, of the first wakeup indication of the first terminal device, in DCI corresponding to the first group of terminals.

In this embodiment of this application, the second wakeup indication is a wakeup indication for at least one terminal device including the first terminal device.

That the second wakeup indication is a wakeup indication for at least one terminal device including the first terminal device may be understood as that the second wakeup indication corresponds to the at least one terminal device including the first terminal device, and the second wakeup indication is used to indicate whether the at least one terminal device including the first terminal device is to wake up or the second wakeup indication is used to indicate that the at least one terminal device including the first terminal device needs to wake up.

Optionally, the at least one terminal device including the first terminal device may be one terminal device, that is, the first terminal device. The second wakeup indication may be used to indicate whether the first terminal device is to wake up or indicates that the first terminal device needs to wake up.

Optionally, the at least one terminal device including the first terminal device may be at least two terminal devices, for example, 2, 3, 20, or 100 terminal devices, or a group of terminal devices that receive the first wakeup indication and that are in a cell served by the network device, or all terminal devices that receive the first wakeup indication and that are in a cell served by the network device, or all terminal devices served by the network device. The second wakeup indication may be used to indicate whether a plurality of terminal devices including the first terminal device are to wake up or need to wake up. Without loss of generality, the second wakeup indication may be configured for the plurality of terminal devices as a common wakeup indication.

There are a plurality of forms of the second wakeup indication.

For example, the second wakeup indication may be included on a second wakeup channel for a second group of terminal devices including the first terminal device. The second wakeup channel for the second group of terminal devices including the first terminal device corresponds to the second group of terminal devices, that is, the second wakeup channel for the second group of terminal devices including the first terminal device is used to carry a wakeup indication of the second group of terminal devices.

Optionally, a quantity of terminal devices in the second group of terminal devices may be greater than a quantity of the at least one terminal device that includes the first terminal device and that can be indicated by the second wakeup indication, and the second wakeup channel carries the second wakeup indication and a wakeup indication of another terminal device that is in the second group of terminal devices and that is different from the at least one terminal device including the first terminal device.

Optionally, the quantity of terminal devices in the second group of terminal devices may be equal to the quantity of the at least one terminal device that includes the first terminal device and that can be indicated by the second wakeup indication, and this is equivalent to that the second wakeup indication is a wakeup indication for the second group of terminal devices. The second wakeup indication is used to indicate whether the second group of terminal devices is to wake up or needs to wake up, and the second wakeup channel is specially used to carry the second wakeup indication.

Optionally, the second wakeup channel may be a physical downlink control channel PDCCH.

For example, when the second group of terminal devices is the at least one terminal device indicated by the second wakeup indication, the second wakeup indication may be information about a bit in downlink control information DCI carried on the PDCCH, the DCI may carry a group ID of the second group of terminal devices, and the group ID of the second group of terminal devices is also configured for each terminal device in the second group of terminal devices. After successfully decoding the DCI by using the configured group ID, each terminal device in the second group of terminal devices may share information in the DCI, that is, each terminal device in the second group of terminal devices may share the second wakeup indication. In other words, the second wakeup indication is used to indicate whether each terminal device in the second group of terminal devices is to wake up or needs to wake up.

Optionally, correspondingly, the configuration information of the second wakeup indication may include configuration information of a control resource set (control resource set) in which the second wakeup channel PDCCH is located and configuration information of a search space of the second wakeup channel PDCCH. A time-frequency resource location of the second wakeup channel for the second group of terminal devices including the first terminal device may be defined by using the configuration information of the control resource set and the configuration information of the search space. Optionally, the configuration information of the second wakeup indication may further include the group ID of the second group of terminal devices, and the like.

For another example, the second wakeup indication may be a second wakeup signal. The second wakeup signal corresponds to the first terminal device, or corresponds to a plurality of terminal devices including the first terminal device. To be specific, the second wakeup signal is used to indicate whether the first terminal device or the plurality of terminal devices including the first terminal device are to wake up or need to wake up.

Optionally, the second wakeup signal may be a first demodulation reference signal (demodulation reference signal, DMRS), a first reference signal (reference signal, RS), or another power saving indication signal.

The first demodulation reference signal is different from a second demodulation reference signal. For example, the second demodulation reference signal is used by a terminal not configured with a wakeup signal to perform channel estimation. When the first terminal device detects the first demodulation reference signal, it may be considered that the network device indicates that the first terminal device needs to wake up. When the first terminal device detects only the second demodulation reference signal but does not detect the first demodulation reference signal, it may be considered that the network device indicates that the first terminal device does not need to wake up. However, the second demodulation reference signal may be used by other UEs not configured with a wakeup indication to perform channel estimation, so as to support these UEs not configured with a wakeup indication to perform blind PDCCH detection.

In some implementations, the first demodulation reference signal and the second demodulation reference signal may be scrambled by using different scrambling codes. For example, the first demodulation reference signal may be scrambled by using a first scrambling code, the second demodulation reference signal may be scrambled by using a second scrambling code, and the first scrambling code and the second scrambling code are different. The first terminal device may determine, based on the scrambling code, whether the first demodulation reference signal or the second demodulation reference signal is received, so as to determine whether the first terminal device receives the second wakeup indication.

Optionally, the first demodulation reference signal is a wideband demodulation reference signal.

Optionally, the second wakeup signal may also be a first sequence in a demodulation reference signal, an existing sequence included in the demodulation reference signal is a second sequence, and the network device may send demodulation reference signals by using different sequences. For example, if the first terminal device detects that the network device sends the demodulation reference signal by using the first sequence, the first terminal device may consider that the second wakeup indication is received, and the first terminal device may wake up. If the first terminal device detects that the network device sends the demodulation reference signal by using the second sequence, the first terminal device may consider that the second wakeup indication is not received, and the first terminal device may not wake up.

Optionally, correspondingly, the configuration information of the second wakeup indication may include transmission occasion information of the second wakeup indication, a first scrambling code of the second wakeup indication, a first sequence of the second wakeup indication, and the like. The transmission occasion information of the second wakeup indication may include an absolute transmission occasion of the second wakeup indication, or a time interval or a relative transmission occasion of the second wakeup indication relative to the first wakeup indication, or a relative transmission occasion of the second wakeup indication relative to an on duration start point of a DRX cycle, and this is not specifically limited in this embodiment of this application. The first terminal device may determine, based on the transmission occasion information of the second wakeup indication, a time domain location at which the network device sends the second wakeup indication.

The demodulation reference signal is used to send the second wakeup indication, so that the second wakeup indication reuses an existing air interface resource, and resource overheads of the second wakeup indication are reduced. In addition, a bandwidth occupied by the demodulation reference signal is relatively large, detection performance is better, and detection accuracy can be improved.

Optionally, the quantity of terminal devices in the second group of terminal devices may be greater than a quantity of terminal devices in the first group of terminal devices. In other words, the first wakeup indication is included in one piece of DCI on the first wakeup channel for the first group of terminal devices, and the DCI corresponds to the wakeup indications of the first group of terminal devices. The second wakeup indication is included in one piece of DCI on the second wakeup channel for the second group of terminal devices, and the DCI corresponds to the wakeup indication of the second group of terminal devices. A quantity of terminal devices served by the DCI in which the second wakeup indication is located is greater than a quantity of terminal devices served by the DCI in which the first wakeup indication is located.

In some embodiments, both a channel on which the first wakeup indication is located and a channel on which the second wakeup indication is located may be physical downlink control channels PDCCHs. It should be understood that the channel on which the first wakeup indication is located is the first wakeup channel, and the channel on which the second wakeup indication is located is the second wakeup channel, that is, both the first wakeup channel and the second wakeup channel may be PDCCHs.

In some embodiments, a channel on which the first wakeup indication is located is a PDCCH, and the second wakeup indication is a demodulation reference signal. It should be understood that the channel on which the first wakeup indication is located, is the first wakeup channel, that is, the first wakeup channel is a PDCCH.

In some embodiments, both the first wakeup indication and the second wakeup indication may be demodulation reference signals, but the first wakeup indication and the second wakeup indication are different demodulation reference signals.

During implementation of this application, the first wakeup indication is used to indicate whether the first terminal device is to wake up, and the second wakeup indication is used to indicate whether the at least one terminal device including the first terminal device is to wake up. That is, both the first wakeup indication and the second wakeup indication may be used to indicate whether the first terminal device is to wake up.

The first terminal device may be configured with a DRX cycle. Optionally, that the first wakeup indication and the second wakeup indication are used to indicate whether the first terminal device is to wake up may be understood as that the first wakeup indication and the second wakeup indication are used to indicate whether the first terminal device needs to detect, in the discontinuous reception DRX cycle, a PDCCH used to schedule data.

Specifically, the DRX cycle includes an active time and an inactive time, and the first wakeup indication and the second wakeup indication may be used to indicate whether the first terminal device needs to detect, in the DRX cycle, the PDCCH used to schedule data, that is, whether the first terminal device needs to enter the active time (for example, whether the first terminal device needs to enable an on duration timer). DCI used to schedule data is carried on the PDCCH used to schedule data. When waking up, the first terminal device needs to enter the active time to detect the PDCCH used to schedule data. In other words, the first wakeup indication and the second wakeup indication may be used to indicate whether the first terminal device needs to wake up in the DRX cycle to enter the active time. Alternatively, for another example, the first wakeup indication and the second wakeup indication may be used to indicate whether the first terminal device needs to detect scheduling DCI within the active time in the DRX cycle.

More specifically, the active time in the DRX cycle includes a valid time period controlled by the on duration timer and a valid time period controlled by a possible inactivity timer. The first wakeup indication and the second wakeup indication may be used to indicate whether the first terminal device is to wake up in the valid time period controlled by the on duration timer in the DRX cycle, that is, the first wakeup indication and the second wakeup indication are used to indicate whether the first terminal device needs to detect, in the valid time period controlled by the on duration timer in the DRX cycle, the PDCCH used to schedule data. Alternatively, the first wakeup indication and the second wakeup indication may be used to indicate whether the first terminal device needs to enable the on duration timer in the DRX cycle, that is, the first wakeup indication and the second wakeup indication are used to indicate whether the first terminal device needs to detect, in the DRX cycle, the PDCCH used to schedule data.

The first wakeup indication is used to indicate, in a plurality of manners, whether the first terminal device needs to detect, in the DRX cycle, the PDCCH used to schedule data. That is, the first wakeup indication is used to indicate, in a plurality of manners, whether the first terminal device is to wake up.

In a possible implementation, the first wakeup indication may indicate that the first terminal device needs to detect, in the DRX cycle, the PDCCH used to schedule data, or indicate that the first terminal device does not need to detect, in the DRX cycle, the PDCCH used to schedule data. That is, the first wakeup indication carries information indicating that the first terminal device is or is not to wake up. For example, that a bit is set to 1 on the first wakeup channel on which the first wakeup indication is located may indicate that the first terminal device needs to detect, in the DRX cycle, the PDCCH used to schedule data (that is, the first terminal device needs to wake up), and that the bit is set to 0 indicates that the first terminal device does not need to detect, in the DRX cycle, the PDCCH used to schedule data (that is, the first terminal device does not need to wake up).

In another possible implementation, whether the first terminal device is to wake up, or whether the first terminal device needs to detect, in the DRX cycle, the PDCCH used to schedule data may be indicated by sending or skipping sending the first wakeup indication. For example, sending, by the network device, the first wakeup indication to the first terminal device may indicate that the first terminal device needs to wake up. Therefore, when the first terminal device detects the first wakeup indication, it is equivalent to indicating that the first terminal device needs to detect, in the DRX cycle, the PDCCH used to schedule data. If the network device does not send the first wakeup indication to the first terminal device, it may indicate that the first terminal device does not need to wake up. Therefore, when the first terminal device does not detect the first wakeup indication, it is equivalent to receiving an indication from the network device indicating that the first terminal device does not need to detect, in the DRX cycle, the PDCCH used to schedule data.

In another possible implementation, that the first terminal device is not to wake up may be indicated by skipping sending the first wakeup indication, and when the first wakeup indication is sent, whether the first terminal device needs to wake up in the DRX cycle is indicated by using sent indication information. For example, if the network device does not send the first wakeup indication to the first terminal device, it may indicate that the first terminal device does not need to wake up. Therefore, when the first terminal device does not detect the first wakeup indication, it is equivalent to receiving an indication from the network device indicating that the first terminal device does not need to detect, in the DRX cycle, the PDCCH used to schedule data. If the network device sends the first wakeup signal to the first terminal device, it may indicate, based on specific indication information that the first terminal device needs to wake up. For example, that a bit is set to 1 on the first wakeup channel on which the first wakeup indication is located may indicate that the first terminal device needs to detect, in the DRX cycle, the PDCCH used to schedule data (that is, the first terminal device needs to wake up), and that the bit is set to 0 indicates that the first terminal device does not need to detect, in the DRX cycle, the PDCCH used to schedule data (that is, the first terminal device does not need to wake up).

A manner in which the second wakeup indication is used to indicate whether the first terminal device needs to detect, in the DRX cycle, the PDCCH used to schedule data is similar to that of the first wakeup indication. For details, refer to the foregoing description. Details are not described herein again.

In some embodiments, if the first terminal device detects the second wakeup indication, the second wakeup indication may be used to indicate that the first terminal device needs to wake up.

Optionally, a priority of the first wakeup indication is higher than a priority of the second wakeup indication. In other words, when the first terminal device detects the first wakeup indication and the second wakeup indication, the first terminal device may determine, preferentially based on the first wakeup indication, whether to wake up. Correspondingly, the configuration information of the first wakeup indication and/or the configuration information of the second wakeup indication may include information indicating that the corresponding wakeup indication is the first wakeup indication or the second wakeup indication. The configuration information of the first wakeup indication and/or the configuration information of the second wakeup indication may include priority information of the first wakeup indication and priority information of the second wakeup indication.

In step S420, the network device sends the first wakeup indication and/or the second wakeup indication to the first terminal device. Correspondingly, the first terminal device detects the first wakeup indication and the second wakeup indication based on the configuration information of the first wakeup indication and the configuration information of the second wakeup indication.

That the network device sends the first wakeup indication and/or the second wakeup indication to the first terminal device may include that the network device sends the second wakeup indication to the first terminal device, or that the network device sends the first wakeup indication and the second wakeup indication to the terminal device. Certainly, that the network device sends the first wakeup indication and/or the second wakeup indication to the first terminal device further includes that the network device sends the first wakeup indication to the first terminal device.

The network device may selectively send the first wakeup indication and/or the second wakeup indication based on a situation. Correspondingly, there may be a plurality of results after the first terminal device detects the first wakeup indication and the second wakeup indication.

It should be understood that, that the first wakeup indication and the second wakeup indication are used to indicate that the first terminal device is to wake up may be understood as indicating that the first terminal device needs to detect the PDCCH used to schedule data. The first wakeup indication and the second wakeup indication are used to indicate that the first terminal device is to wake up, specifically indicate that the first terminal device is to wake up in the active time of the DRX cycle and detect the PDCCH used to schedule data; and more specifically, indicate that the first terminal device is to wake up within the valid time period controlled by the on duration timer of the DRX cycle, and detect the PDCCH used to schedule data; or indicate whether the first terminal device needs to enable the on duration timer in the DRX cycle.

In a possible implementation, the network device may send only the first wakeup indication to the first terminal device.

For example, information in the first wakeup indication may be used to indicate whether the first terminal device is to wake up. For example, because the first wakeup indication is a wakeup indication for the first terminal device, when the network device needs to wake up the first terminal device, the network device may send the first wakeup indication to the first terminal device, so as to indicate that the first terminal device is to wake up. When the network device does not need to wake up the first terminal device, the network device may send the first wakeup indication to the first terminal device, so as to indicate that the first terminal device does not need to wake up. Correspondingly, when detecting the first wakeup indication, the first terminal device may determine, based on the information in the first wakeup indication, whether to wake up or not. If the first terminal device does not detect the first wakeup indication, the first terminal device may wake up or not by default.

Optionally, the first wakeup indication may be included on the first wakeup channel for the first terminal device, the first wakeup indication is bit information in DCI on the first wakeup channel, and the first terminal device may determine, based on the bit information, whether to wake up.

Optionally, the second wakeup indication may be included on the first wakeup channel for the first group of terminal devices including the first terminal device, the first wakeup indication may be bit field information in DCI on the first wakeup channel, and the first terminal device may determine, based on the corresponding bit field information, whether to wake up.

For another example, the network device may indicate, by sending or skipping sending the first wakeup indication, whether the first terminal device needs to wake up. For example, when the network device needs to wake up the first terminal device, the network device may send the first wakeup indication to indicate that the first terminal device needs to wake up. When the network device does not need to wake up the first terminal device, the network device may not send the first wakeup indication, indicating that the first terminal device does not need to wake up. Correspondingly, the first terminal device is to wake up when detecting the first wakeup indication, and is not to wake up when not detecting the first wakeup indication.

The network device may send the configuration information of the first wakeup indication and the configuration information of the second wakeup indication to the first terminal device. However, when the network device does not need to wake up the first terminal device, the network device may send only the first wakeup indication to indicate that the first terminal device does not need to wake up; or may not send the first wakeup indication, indicating that the first terminal device does not need to wake up, and does not need to send the second wakeup indication to the first terminal device.

For a form of the first wakeup indication and a time-frequency location at which the first wakeup indication is located, refer to related descriptions in step S410. Details are not described herein again.

In another possible implementation, the network device may send the first wakeup indication and the second wakeup indication to the first terminal device. The network device may first send the first wakeup indication, and then send the second wakeup indication. Alternatively, the network device first sends the second wakeup indication, and then sends the first wakeup indication. Alternatively, the network device may simultaneously send the first wakeup indication and the second wakeup indication to the terminal. This is not specifically limited in this embodiment of this application.

Optionally, a priority of the first wakeup indication is higher than a priority of the second wakeup indication.

That is, when the first terminal device detects the second wakeup indication but does not detect the first wakeup indication, the first terminal device may determine, based on the second wakeup indication, whether to wake up. For example, when the network device needs to wake up the first terminal device, the network device sends the first wakeup indication and the second wakeup indication to the first terminal device, where the first wakeup indication is used to indicate that the first terminal device is to wake up, and the second wakeup indication is used to indicate that the at least one terminal device including the first terminal device is to wake up. That is, both the first wakeup indication and the second wakeup indication sent by the network device may indicate that the first terminal device is to wake up. When detecting only the second wakeup indication, the first terminal device may determine, based on the detected second wakeup indication, to wake up. For another example, when the network device does not need to wake up the first terminal device, the network device sends the first wakeup indication and the second wakeup indication to the first terminal device, where the first wakeup indication is used to indicate that the first terminal device is not to wake up, and the second wakeup indication is used to indicate that the at least one terminal device including the first terminal device is not to wake up. That is, both the first wakeup indication and the second wakeup indication sent by the network device may indicate that the first terminal device does not need to wake up. When detecting only the second wakeup indication, the first terminal device may determine, based on the detected second wakeup indication, not to wake up.

In the foregoing technical solution, the network device sends, to the first terminal device, two wakeup indications used to indicate that the first terminal device is to wake up, so that when the first terminal device misses detecting or falsely detects the first wakeup indication, the first terminal device can further detect the second wakeup indication and determine, based on the second wakeup indication, to wake up. In this way, a case in which the network device needs to wake up the terminal device but the first terminal device does not wake up may be reduced or avoided, so as to reduce or avoid a possible problem that a data receiving and sending delay increases.

When the first terminal device detects the first wakeup indication and the second wakeup indication, the first terminal device determines, based on the first wakeup indication, whether to wake up. For example, when the network device needs to wake up the first terminal device, the network device sends the first wakeup indication and the second wakeup indication to the first terminal device, where the first wakeup indication is used to indicate that the first terminal device is to wake up, and the second wakeup indication is used to indicate that the at least one terminal device including the first terminal device is to wake up. That is, both the first wakeup indication and the second wakeup indication sent by the network device indicate that the first terminal device is to wake up. When detecting the first wakeup indication and the second wakeup indication, the first terminal device may determine, based on the detected first wakeup indication, to wake up. Alternatively, when the network device needs to wake up the first terminal device, the network device sends the first wakeup indication to the first terminal device to indicate that the first terminal device is to wake up, and the first terminal device detects a second wakeup indication sent by the network device to another terminal device in the at least one terminal device including the first terminal device. The second wakeup indication is used to indicate that the at least one terminal device including the first terminal device is not to wake up, and this is equivalent to that the network device sends the second wakeup indication to the first terminal device to indicate that the first terminal device is not to wake up. Therefore, the first terminal device determines, based on the detected first wakeup indication that the first terminal device is to wake up. For another example, when the network device does not need to wake up the first terminal device, the network device sends the first wakeup indication and the second wakeup indication to the first terminal device, where the first wakeup indication is used to indicate that the first terminal device is not to wake up, and the second wakeup indication is used to indicate that the at least one terminal device including the first terminal device is not to wake up. That is, both the first wakeup indication and the second wakeup indication sent by the network device indicate that the first terminal device does not need to wake up. When detecting the first wakeup indication and the second wakeup indication, the first terminal device may determine, based on the detected first wakeup indication, not to wake up. Alternatively, when the network device does not need to wake up the first terminal device, the network device sends the first wakeup indication to the first terminal device to indicate that the first terminal device is not to wake up, and the first terminal device detects a second wakeup indication sent by the network device to another terminal device in the at least one terminal device including the first terminal device. The second wakeup indication is used to indicate that the at least one terminal device including the first terminal device is to wake up, and this is equivalent to that the network device sends the second wakeup indication to the first terminal device to indicate that the first terminal device is to wake up. Therefore, the first terminal device determines, based on the detected first wakeup indication that the first terminal device is not to wake up, and the second wakeup indication is used to wake up at least one terminal device other than the first terminal device.

It should be noted that, in some embodiments, when the second wakeup indication is used to indicate that the at least one terminal device including the first terminal device is to wake up, the second wakeup indication is also detected by another terminal device in the at least one terminal device including the first terminal device, and indicates that the another terminal device is to wake up.

The following describes an example in which the at least one terminal device including the first terminal device further includes a second terminal device. The network device sends configuration information of a third wakeup indication and the configuration information of the second wakeup indication to the second terminal device, where the third wakeup indication is a wakeup indication for the second terminal device, that is, the third wakeup indication is used to indicate whether the second terminal device is to wake up. In addition, the network device sends the third wakeup indication and/or the second wakeup indication to the second terminal device. Correspondingly, the second terminal device detects the third wakeup indication and the second wakeup indication based on the configuration information of the third wakeup indication and the configuration information of the second wakeup indication. The foregoing process is similar to the foregoing description of the first terminal device, and is not described.

As an example instead of a limitation, when the network device does not need to wake up the first terminal device but needs to wake up the second terminal device, the network device may send the first wakeup indication and the second wakeup indication to the first terminal device, where the first wakeup indication is used to indicate that the first terminal device is not to wake up, and the second wakeup indication is used to indicate that the at least one terminal device including the first terminal device and the second terminal device is to wake up. Therefore, when detecting the first wakeup indication and the second wakeup indication, the first terminal device determines, based on the first wakeup indication, not to wake up.

Optionally, for the second terminal device, the network device may send the second wakeup indication only to the second terminal device, so as to indicate that the second terminal device is to wake up, and when detecting the second wakeup indication, the second terminal device determines, based on the second wakeup indication, to wake up.

Optionally, for the second terminal device, the network device may send the second wakeup indication and the third wakeup indication to the second terminal device, where the second wakeup indication is used to indicate that the at least one terminal device is to wake up, and the third wakeup indication is used to indicate that the second terminal device is to wake up. If the second terminal device detects the third wakeup indication or detects the second wakeup indication, the second terminal device may determine, based on the third wakeup indication, to wake up; or if the second terminal device detects the second wakeup indication, the second terminal device may determine, based on the second wakeup indication, to wake up.

As an example instead of a limitation, when the network device needs to wake up the first terminal device but does not need to wake up the second terminal device, the network device sends the first wakeup indication and the second wakeup indication to the first terminal device, where the first wakeup indication is used to indicate that the first terminal device is to wake up, and the second wakeup indication is used to indicate that the at least one terminal device is to wake up. For the second terminal device, the second terminal device may detect a wakeup indication for the second terminal device that is sent by the network device to the second terminal device, and also detect the second wakeup indication sent by the network device to the first terminal device. For the second terminal device, the second terminal device may alternatively determine, preferentially based on the detected wakeup indication for the second terminal device, whether to wake up, without determining, based on the detected second wakeup indication, to wake up. For example, if the second terminal device detects that the third wakeup indication sent by the network device for the second terminal device is used to indicate that the second terminal device does not need to wake up, and the second wakeup indication sent by the network device and detected by the second terminal device is used to indicate that the at least one terminal device including the first terminal device and the second terminal device is to wake up, the second terminal device may determine, based on the third wakeup indication for the second terminal device, not to wake up.

For the network device, when the second wakeup indication sent by the network device to the first terminal device is used to indicate that a plurality of terminal devices including the first terminal device are to wake up, and in some cases, the network device does not need to wake up all the terminal devices, when sending the second wakeup indication to a terminal device that needs to wake up, the network device may further send, to a terminal device that does not need to wake up, a wakeup indication corresponding to each terminal device in the terminal device that does not need to wake up. The wakeup indication corresponding to each terminal device that does not need to wake up is used to indicate that the corresponding terminal device is not to wake up. For example, the second wakeup indication is used to indicate that N terminal devices including the first terminal device are to wake up, while M terminal devices in the N terminal devices do not need to wake up. Therefore, when sending the second wakeup indication to the N terminal devices, the network device may further send M wakeup indications for the M terminal devices to the M terminal devices, where the M wakeup indications respectively indicate that the corresponding terminal devices do not need to wake up. Correspondingly, each terminal device in the M terminal devices may detect both the second wakeup indication and a wakeup indication for the terminal device itself, and each terminal device in the M terminal devices determines, based on the wakeup indication for the terminal device, not to wake up. In other words, for each terminal device in the M terminal devices, a priority of the wakeup indication for the terminal device is higher than a priority of the second wakeup indication. When detecting the second wakeup indication, the terminal device that needs to wake up may determine, based on the second wakeup indication, to wake up.

In the foregoing technical solution, a case in which the network device does not have sufficient time-frequency resources to send a wakeup indication for each terminal device can also be resolved in a manner of sending the second wakeup indication used for the at least one terminal device and corresponding wakeup indications for some terminal devices in the at least one terminal device. That is, when the network device does not have sufficient time-frequency resources to send the first wakeup indication for each terminal device, the network device may send the second wakeup indication for all terminal devices to indicate that all the terminal devices are to wake up, and send, to the terminal device that does not need to wake up, the corresponding first wakeup indication for the terminal device that does not need to wake up, to indicate that the terminal device does not need to wake up. This may resolve a problem of blockage of the network device, and may further cause the terminal device that needs to wake up to wake up and the terminal device that does not need to wake up not to wake up.

In addition, a priority is configured for a wakeup indication detected by a terminal device, so that the terminal device can determine, based on a wakeup indication with a higher priority, whether to wake up, thereby avoiding a case in which the terminal device that does not need to wake up but wake up.

When the first terminal device detects the first wakeup indication but does not detect the second wakeup indication, the first terminal device determines, based on the first wakeup indication, whether to wake up.

When the first terminal device does not detect the first wakeup indication and the second wakeup indication, the first terminal device may not need to wake up by default.

For another example, the network device may send the second wakeup indication only to the first terminal device. The second wakeup indication is a wakeup indication indicating the at least one terminal device including the first terminal device, and is used to indicate whether the at least one terminal device including the first terminal device is to wake up, and this is equivalent to that the at least one terminal device including the first terminal device may share the second wakeup indication. When the network device does not have sufficient time-frequency resources to send the first wakeup indication to the plurality of terminal devices, that is, when blockage occurs on the network device, the network device may send only the second wakeup indication, to wake up all terminal devices configured with the second wakeup indication. For example, the network device may configure the second wakeup indication for all terminal devices served by the network device, or configure the second wakeup indication for all terminal devices in a cell of the network device. In this way, the network device may wake up all the terminal devices served by the network device or all the terminal devices in the cell. This can resolve a case in which the first wakeup indications corresponding to the plurality of terminal devices cannot be sent because of a network blockage problem, thereby avoiding a case in which the network device requires a terminal device to wake up but the terminal device does not wake up because the terminal device does not receive the first wakeup indication, thereby reducing or avoiding a possible problem that a data receiving and sending delay increases. In this embodiment of this application, the second wakeup indication is configured, so that a terminal device that does not detect the first wakeup indication can determine, based on the second wakeup indication, whether the terminal device needs to wake up. This reduces impact on the terminal device that is caused by miss detection due to channel quality deterioration or because a base station does not send the first wakeup indication due to PDCCH resource blockage, thereby avoiding a possibility that the terminal device cannot wake up and cannot receive scheduling DCI for the foregoing reasons, and avoiding a possibility of a delay, in sending some data, caused by the terminal device.

An embodiment of this application further provides another terminal device wakeup method. The method may be executed by a network device and a first terminal device. The network device may be, for example, the network device 110 in FIG. 1. The first terminal device may be, for example, the terminal device 120 in FIG. 1. FIG. 4 is still used as an example.

In step S410, operations of the network device and the first terminal device may be replaced with the following operations. The network device sends configuration information of a first wakeup indication to the first terminal device. Correspondingly, the first terminal device receives the configuration information of the first wakeup indication from the network device, where the first wakeup indication is used to indicate whether the first terminal device is to wake up.

In step S420, an operation of the first terminal device may be replaced with the following operation. The first terminal device detects the first wakeup indication based on the configuration information of the first wakeup indication.

Optionally, when the first terminal device detects the first wakeup indication, the first terminal device may determine, based on the first wakeup indication, whether the terminal device is to wake up.

Optionally, when the first terminal device does not detect the first wakeup indication, the first terminal device determines to wake up.

That is, when the first terminal device does not detect the first wakeup indication, the first terminal device is to wake up by default, and this reduces or avoids a case in which the first terminal device needs to wake up but does not wake up by default because the first wakeup indication is not detected.

For example, the first wakeup indication is included on a first wakeup channel PDCCH for a plurality of terminal devices including the first terminal device, and a plurality of pieces of bit field information of DCI on the first wakeup channel correspond to wakeup indications of the plurality of terminal devices. After detecting the DCI on the first wakeup channel, each of the plurality of terminal devices obtains a wakeup indication of the terminal device itself in a corresponding bit field, where one piece of bit field information is the first wakeup indication of the first terminal device. In some cases, if the first terminal device does not detect the DCI, the first terminal device cannot obtain the first wakeup indication of the first terminal device. In this case, the first terminal device needs to wake up by default, so as to avoid a problem of a data receiving and sending delay caused when the first terminal device misses a scheduling opportunity of a DRX cycle.

For the configuration information of the first wakeup indication, refer to the foregoing description. In addition to the foregoing information, in this embodiment of this application, the configuration information of the first wakeup indication further includes information used to indicate that, when not detecting the first wakeup indication, a terminal device determines to wake up.

For a form of the first wakeup indication, location information of the first wakeup indication, the configuration information of the first wakeup indication, and the like, refer to the foregoing description. For brevity, details are not described herein again.

Figure 5:
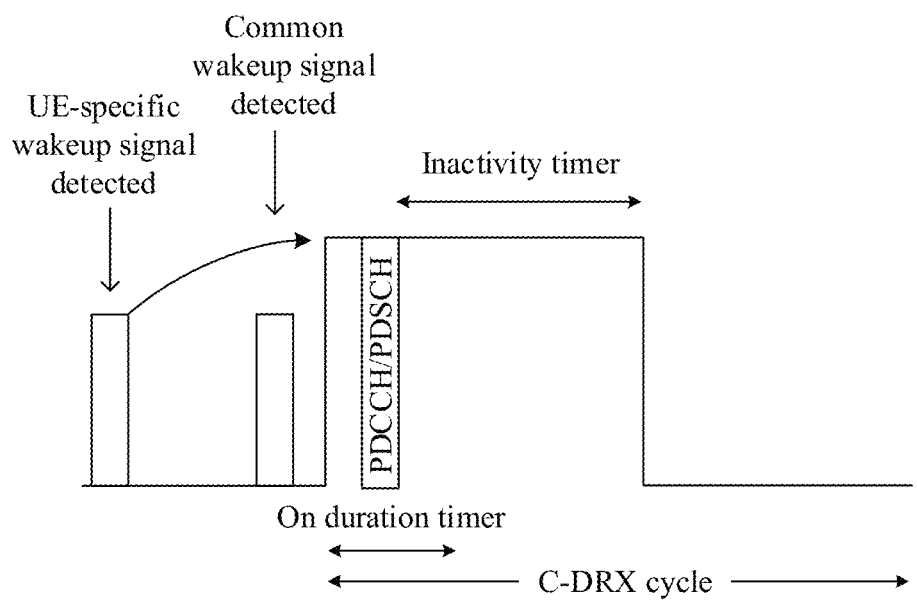
FIG. 5 is a schematic diagram of a status of a terminal device in a terminal device wakeup method according to an embodiment of this application.
Figure 6:
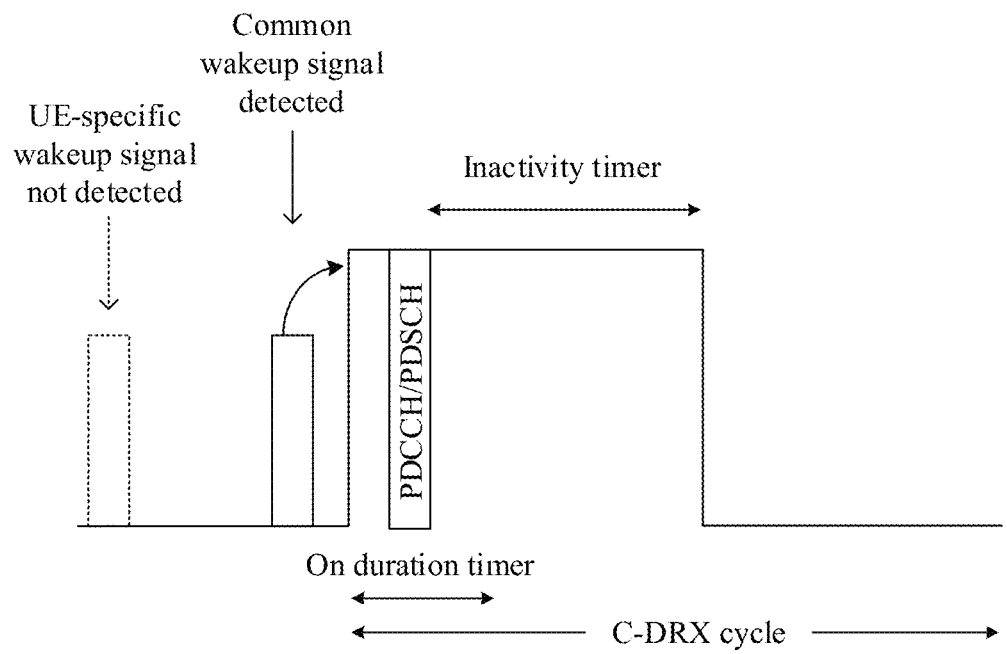
FIG. 6 is a schematic diagram of a status of a terminal device in a terminal device wakeup method according to another embodiment of this application.
Figure 7:
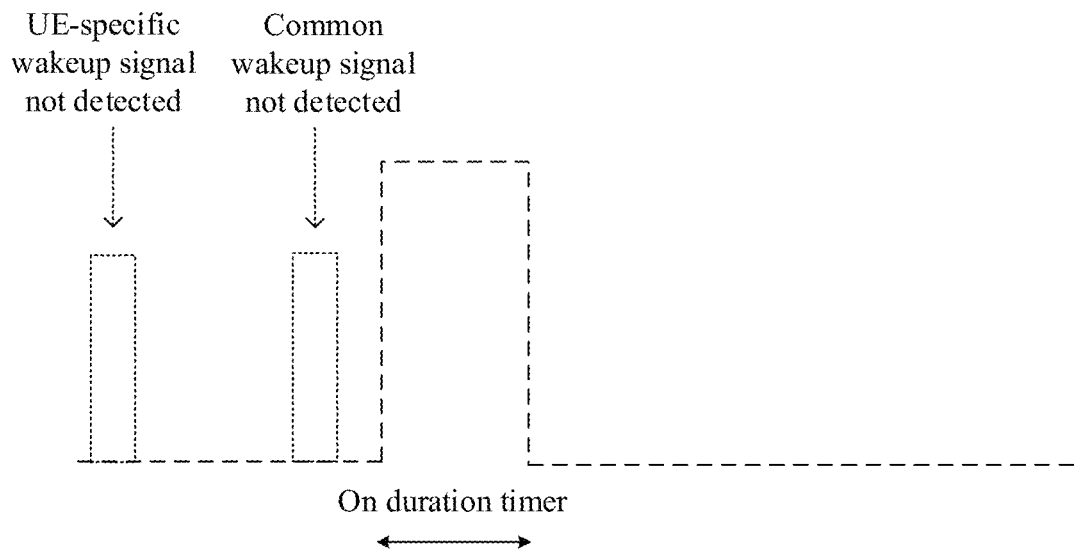
FIG. 7 is a schematic diagram of a status of a terminal device in a terminal device wakeup method according to another embodiment of this application.

With reference to FIG. 5 to FIG. 7, the following describes in more detail some specific nonrestrictive examples of the embodiments of this application.

For ease of understanding, the following embodiments use an example in which a network device sends a first wakeup indication and a second wakeup indication, and the second wakeup indication is used to indicate that a terminal device is to wake up.

For example, the first wakeup indication is included on a first wakeup channel for a first terminal device. For example, the first wakeup channel is a PDCCH, the first wakeup indication may be information about a bit of DCI carried on the first wakeup channel, and the DCI in which the first wakeup indication is located is DCI dedicated to the first terminal device.

The second wakeup indication is included on a second wakeup channel for a group of terminal devices including the first terminal device. For example, the second wakeup channel is a PDCCH, and the second wakeup indication is a wakeup indication of the group of terminal devices, that is, a UE range to which the second wakeup indication applies is the group of terminal devices, and the group of terminal devices shares the second wakeup indication. The second wakeup indication may be located in DCI on the second wakeup channel PDCCH, and the second wakeup indication in the DCI is used to indicate that the group of terminal devices is to wake up.

The first wakeup channel PDCCH may be the same as or may be different from the second wakeup channel PDCCH. For ease of understanding, in this embodiment of this application, the DCI that is used to carry the first wakeup indication and that is on the first wakeup channel PDCCH on which the first wakeup indication is located is referred to as a UE-specific wakeup signal (UE-specific wakeup signal, UE-specific WUS), and the DCI that is used to carry the second wakeup indication and that is on the second wakeup channel PDCCH on which the second wakeup indication is located is referred to as a common wakeup signal (common wakeup signal, common WUS). That is, the UE-specific wakeup signal is one type of DCI, and the UE-specific wakeup signal is used to indicate whether the first terminal device is to wake up. The common wakeup signal is also one type of DCI, and the common wakeup signal is used to indicate that a group of terminal devices including the first terminal device is to wake up. Alternatively, the DCI of the UE-specific wakeup signal and the DCI of the common wakeup signal use a same DCI format, and different RNTIs or scrambling codes are used to distinguish between the UE-specific wakeup signal and the common wakeup signal.

Specifically, in a DRX mode, in addition to configuring the UE-specific wakeup signal for the first terminal device, the network device further configures the common wakeup signal for the first terminal device. The UE-specific wakeup signal is a wakeup signal for the first terminal device, and can only indicate whether the first terminal device is to wake up. The common wakeup signal is a wakeup signal for a group of terminal devices including the first terminal device, and can wake up the group of terminal devices.

Optionally, the common wakeup signal may be a group-based wakeup signal, that is, the common wakeup signal is a wakeup signal for a group of terminal devices. When the group of terminal devices detects only the common wakeup signal, the common wakeup signal can wake up the group of terminal devices.

Optionally, the common wakeup signal may be a wakeup signal that is based on all terminal devices, that is, the common wakeup signal is a wakeup signal for all the terminal devices. When only the common wakeup signal is detected by all the terminal devices, the common wakeup signal can wake up all the terminal devices. It should be understood that all the terminal devices may be all terminal devices served by the network device.

The network device sends configuration information of the first wakeup indication and configuration information of the second wakeup indication to the first terminal device, that is, sends configuration information of the UE-specific wakeup signal and configuration information of the common wakeup signal to the first terminal device.

The configuration information of the UE-specific wakeup signal includes at least the following content: configuration information of a control resource set (control resource set) for sending the UE-specific wakeup signal, and configuration information of a search space for sending the UE-specific wakeup signal. A specific time-frequency resource location at which the UE-specific wakeup signal is located may be defined by using the configuration information of the control resource set and the configuration information of the search space. Optionally, the configuration information of the UE-specific wakeup signal further includes an RNTI of the first terminal device that is used to send a UE-specific wakeup channel.

The configuration information of the common wakeup signal includes at least the following content: configuration information of a control resource set (control resource set) for sending the common wakeup signal, and configuration information of a search space for sending the common wakeup signal. A specific time-frequency resource location at which the common wakeup signal is located may be defined by using the configuration information of the control resource set and the configuration information of the search space. Optionally, the configuration information of the common wakeup signal further includes a common C-RNTI corresponding to DCI for sending the common wakeup indication.

Referring to FIG. 5 to FIG. 7, that the network device sends the first wakeup indication and/or the second wakeup indication means that the network device sends the UE-specific wakeup signal and/or the common wakeup signal to the first terminal device in this embodiment of this application.

It should be noted that, in FIG. 5 to FIG. 7, a time relationship between transmission occasions of the first wakeup indication and the second wakeup indication (the UE-specific wakeup signal and the common wakeup signal are separately used as examples in FIG. 5 to FIG. 7) is merely an example. This embodiment of this application includes but is not limited to different transmission occasions of the first wakeup indication and the second wakeup indication. In this embodiment of this application, the first wakeup indication and the second wakeup indication may alternatively be simultaneously sent. Correspondingly, the terminal device may simultaneously receive the first wakeup indication and the second wakeup indication.

It should be further noted that a sending time of each of the UE-specific wakeup signal and the common wakeup signal may be the same as or different from a sending time of the configuration information corresponding to each of the UE-specific wakeup signal and the common wakeup signal. That is, the network device may simultaneously send the wakeup signal and the configuration information of the wakeup signal, or may separately send the wakeup signal and the configuration information of the wakeup signal.

The UE-specific wakeup signal and the common wakeup signal sent by the network device are used to indicate, within an inactive time or a start time period of on duration of the DRX cycle, whether the first terminal device needs to wake up within a valid time period (that is, the on duration) controlled by an on duration timer in the corresponding DRX cycle, and detect a PDCCH used to schedule data; or are used to indicate whether the first terminal needs to enable the on duration timer.

When the network device sends only the UE-specific wakeup signal, or the network device sends the UE-specific wakeup signal and the common wakeup signal, but the first terminal device does not detect the common wakeup signal, the first terminal device detects only the UE-specific wakeup signal, and the first terminal device determines, based on the UE-specific wakeup signal, whether to wake up. If the first terminal device determines to wake up, the first terminal device further detects, in the on duration, the PDCCH used to schedule data, or determines to enable the on duration timer. If the first terminal device determines not to wake up, the first terminal device continues to maintain a sleep state or the inactive time.

For example, when the network device sends the UE-specific wakeup signal and the common wakeup signal, the first terminal device determines, based on the UE-specific wakeup signal, whether to wake up, and if the first terminal device determines to wake up, the first terminal device further detects, in the on duration, the PDCCH used to schedule data, or determines to enable the on duration timer. As shown in FIG. 5, after determining to wake up, the first terminal device detects, in the on duration, the PDCCH used to schedule data. After blind detection on the PDCCH is completed, if the first terminal device detects that scheduling DCI is used to schedule new data transmission, the first terminal device enables an inactivity timer. If the UE-specific wakeup signal indicates that the first terminal device does not need to wake up, the first terminal device may not wake up even if the common wakeup signal indicates that the first terminal device needs to wake up.

When the network device sends only the common wakeup signal, or the network device sends the UE-specific wakeup signal and the common wakeup signal, but the first terminal device does not detect the UE-specific wakeup signal, and the first terminal device detects only the common wakeup signal, the first terminal device determines, based on the common wakeup signal, to wake up, and detects, in the on duration, the PDCCH used to schedule data, or determines to enable the on duration timer. As shown in FIG. 6, a wakeup and detection process of the first terminal device is the same as that in the related description in FIG. 5. For brevity, details are not described again.

When the network device sends the UE-specific wakeup signal and/or the common wakeup signal, or does not send the UE-specific wakeup signal and the common wakeup signal, the first terminal device detects neither the UE-specific wakeup signal nor the common wakeup signal, and the first terminal device may not wake up by default. As shown in FIG. 7, the first terminal device is not to wake up in the on duration.

In this embodiment of this application, the common wakeup signal is set, so that UE that does not detect the UE-specific wakeup signal can determine, based on the common wakeup signal, whether the UE needs to wake up in the on duration, thereby reducing impact of channel quality deterioration or blockage on the UE, and avoiding a possibility of a delay in sending some data.

For another example, the first wakeup indication is included on a first wakeup channel for a first group of terminal devices including the first terminal device. For example, the first wakeup channel is a PDCCH, and the first wakeup indication may be information about one bit field of DCI carried on the first wakeup channel PDCCH. The DCI may include a plurality of bit fields, and information about each bit field is a UE-specific wakeup indication of a corresponding terminal device in the first group of terminal devices. The DCI in which the first wakeup indication is located is DCI corresponding to the first group of terminal devices.

The second wakeup indication is included on a second wakeup channel for a second group of terminal devices including the first terminal device. For example, the second wakeup channel is a PDCCH, and the second wakeup indication is a wakeup indication of the second group of terminal devices, that is, a UE range to which the second wakeup indication applies is the second group of terminal devices, and the second group of terminal devices shares the second wakeup indication. The second wakeup indication may be located in one piece of DCI on the second wakeup channel PDCCH, and the second wakeup indication in the DCI is used to indicate that the second group of terminal devices is to wake up.

The first wakeup channel PDCCH may be the same as or may be different from the second wakeup channel PDCCH. For ease of understanding, in this embodiment of this application, DCI that is on the first wakeup channel PDCCH on which the first wakeup indication is located and that is used to carry a wakeup indication corresponding to each terminal device in the first group of terminal devices is referred to as a group wakeup signal (group wakeup signal, group WUS), and DCI that is on the second wakeup channel PDCCH on which the second wakeup indication is located and that is used to carry the second wakeup indication is referred to as a common wakeup signal (common wakeup signal, common WUS). That is, the group wakeup signal is one type of DCI, the DCI includes a UE-specific wakeup indication corresponding to each terminal device in the first group of terminal devices, and the UE-specific wakeup indication corresponding to each terminal device is used to indicate whether the corresponding terminal device is to wake up. The common wakeup signal is also one type of DCI, and the common wakeup signal is used to indicate that the second group of terminal devices including the first terminal device is to wake up.

Specifically, in the DRX mode, in addition to configuring the group wakeup signal for the first terminal device, the network device further configures the common wakeup signal for the first terminal device. The group wakeup signal is a wakeup signal for the first group of terminal devices, and can separately indicate whether each terminal device in the first group of terminal devices is to wake up. The common wakeup signal is a wakeup signal for the second group of terminal devices including the first terminal device, and can wake up the second group of terminal devices.

Optionally, a quantity of terminal devices in the second group of terminal devices may be greater than a quantity of terminal devices in the first group of terminal devices.

The network device sends the configuration information of the first wakeup indication and the configuration information of the second wakeup indication to the first terminal device, that is, sends configuration information of the group wakeup signal and configuration information of the common wakeup signal to the first terminal device.

The configuration information of the group wakeup signal includes at least the following content: configuration information of a control resource set (control resource set) for sending the group wakeup signal, and configuration information of a search space for sending the group wakeup signal. A specific time-frequency resource location at which the group wakeup signal is located may be defined by using the configuration information of the control resource set and the configuration information of the search space. Optionally, the configuration information of the group wakeup signal further includes an RNTI corresponding to the first group of terminal devices.

The configuration information of the common wakeup signal includes at least the following content: configuration information of a control resource set (control resource set) for sending the common wakeup signal, and configuration information of a search space for sending the common wakeup signal. A specific time-frequency resource location at which the common wakeup signal is located may be defined by using the configuration information of the control resource set and the configuration information of the search space. Optionally, the configuration information of the common wakeup signal further includes an RNTI corresponding to the second group of terminal devices.

Optionally, a sending time of the group wakeup signal may be the same as or may be different from a sending time of the common wakeup signal. That is, the network device may send the group wakeup signal and the common wakeup signal simultaneously, or may separately send the group wakeup signal and the common wakeup signal. This is not specifically limited in this embodiment of this application.

Optionally, the sending time of the group wakeup signal (or the common wakeup signal) may be the same as or may be different from a sending time of the configuration information of the group wakeup signal (or the configuration information of the common wakeup signal). That is, the network device may simultaneously send the group wakeup signal (or the common wakeup signal) and the configuration information of the group wakeup signal (or the configuration information of the common wakeup signal), or may separately send the group wakeup signal (or the common wakeup signal) and the configuration information of the group wakeup signal (or the configuration information of the common wakeup signal). This is not specifically limited in this embodiment of this application.

Still referring to FIG. 5 to FIG. 7 that the network device sends the first wakeup indication and/or the second wakeup indication means that the network device sends the group wakeup signal and/or the common wakeup signal to the first terminal device in this embodiment of this application. A detection result and a corresponding behavior of the first terminal device are similar to those in the case that the network device sends the UE-specific wakeup signal and/or the common wakeup signal to the first terminal device. For details, refer to the foregoing related description. Details are not described herein again.

In this embodiment of this application, the common wakeup signal is set, so that UE that does not detect the group wakeup signal can determine, based on the common wakeup signal, whether the UE needs to wake up in the on duration, thereby reducing impact of channel quality deterioration or blockage on the UE, and avoiding a possibility of a delay in sending some data.

In still another example, the first wakeup indication may be included on the first wakeup channel (for example, a PDCCH), and the second wakeup indication may be a second wakeup signal. For example, the second wakeup signal is a demodulation reference signal, that is, the second wakeup indication is a demodulation reference signal (for example, a wideband DMRS).

When the demodulation reference signal is used for channel estimation of DCI, a frequency domain bandwidth occupied by the demodulation reference signal is far greater than that occupied by common DCI, and a resource block RB is continuous in frequency domain. Therefore, with the demodulation reference signal, the UE can perform smooth filtering and has better detection performance. It is more flexible to use the demodulation reference signal to send the second wakeup indication, and blockage does not easily occur.

To distinguish between a demodulation reference signal used to wake up the first terminal device and a demodulation reference signal not having a wakeup function, in this embodiment of this application, the demodulation reference signal used to wake up the first terminal device is denoted as a first demodulation reference signal, and the demodulation reference signal not having a wakeup function is denoted as a second demodulation reference signal. The first demodulation reference signal and the second demodulation reference signal may be scrambled by using different scrambling codes. For example, the first demodulation reference signal may be scrambled by using a first scrambling code, and the second demodulation reference signal may be scrambled by using a second scrambling code. The first terminal device may determine, based on different scrambling codes, whether the first demodulation reference signal used to wake up the first terminal device or the second demodulation reference signal is detected. Alternatively, the first terminal device may determine, based on whether a demodulation reference signal exists, for example, based on received energy, whether the network device sends the second wakeup indication. For example, the second demodulation reference signal is used by a terminal not configured with a wakeup signal to perform channel estimation. When the first terminal device detects the first demodulation reference signal, it may be considered that the network device indicates that the first terminal device needs to wake up. When the first terminal device detects only the second demodulation reference signal but does not detect the first demodulation reference signal, it may be considered that the network device indicates that the first terminal device does not need to wake up. However, the second demodulation reference signal may be used by other UEs not configured with a wakeup indication to perform channel estimation, so as to support these UEs not configured with a wakeup indication in performing blind PDCCH detection.

In some embodiments, the first demodulation reference signal and the second demodulation reference signal may be sent by using different sequences. For example, the first demodulation reference signal may be sent by using a first sequence, and the second demodulation reference signal may be sent by using a second sequence. The first terminal device may determine, based on different sequences detected, whether the first demodulation reference signal used to wake up the first terminal device or the second demodulation reference signal not having the wakeup function but used for channel estimation is detected.

The configuration information of the second wakeup indication may include transmission occasion information of the second wakeup indication, for example, an absolute transmission occasion of the second wakeup indication in time domain or a relative transmission occasion relative to the first wakeup indication; and may further include a second scrambling code, a second sequence, or the like of the second wakeup indication. It should be noted that, during implementation of this application, the second wakeup indication and the first wakeup indication may be simultaneously sent. Therefore, the configuration information of the second wakeup indication may not include the transmission occasion information of the second wakeup indication.

In this embodiment of this application, the common wakeup signal is set, so that UE that does not detect the group wakeup signal can determine, based on the common wakeup signal, whether the UE needs to wake up in the on duration, thereby reducing impact of channel quality deterioration or blockage on the UE, and avoiding a possibility of a delay in sending some data. In addition, because the wideband DMRS is used for indication, the common wakeup signal can reuse an existing air interface resource, and resource overheads of the common wakeup signal are reduced. In addition, the wideband DMRS provides better detection performance, and detection accuracy can be improved.

The foregoing describes the method embodiments of the embodiments of this application in detail with reference to FIG. 1 to FIG. 7. The following describes apparatus embodiments of the embodiments of this application in detail with reference to FIG. 8 to FIG. 11. It should be understood that descriptions of the method embodiments correspond to descriptions of the apparatus embodiments. Therefore, for parts that are not described in detail, refer to the method embodiments above.

Figure 8:
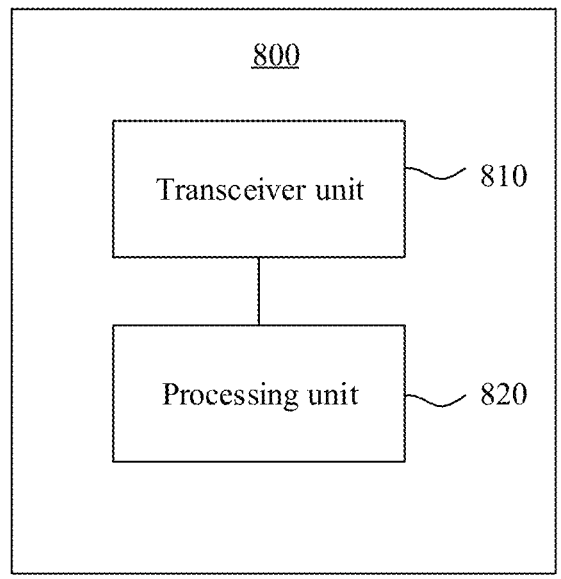
FIG. 8 is a schematic structural diagram of a terminal device according to an embodiment of this application.

FIG. 8 is a schematic structural diagram of a terminal device according to an embodiment of this application. The terminal device 800 in FIG. 8 may be a specific example of the terminal device 120 in FIG. 1. The apparatus shown in FIG. 8 may be configured to perform the method shown in FIG. 4, and specifically implement the embodiments shown in FIG. 5 to FIG. 7. To avoid redundancy, descriptions are not repeated.

The terminal device 800 shown in FIG. 8 includes a transceiver unit 810 and a processing unit 820.

The transceiver unit 810 is configured to receive configuration information of a first wakeup indication and configuration information of a second wakeup indication from a network device, where the first wakeup indication is used to indicate whether the terminal device is to wake up, and the second wakeup indication is used to indicate whether at least one terminal device including the terminal device is to wake up; and the processing unit 820 is configured to detect the first wakeup indication and the second wakeup indication based on the configuration information of the first wakeup indication and the configuration information of the second wakeup indication.

Optionally, when the processing unit 820 detects the second wakeup indication but does not detect the first wakeup indication, the processing unit 820 is further configured to determine, based on the second wakeup indication, whether the terminal device is to wake up.

Optionally, when the processing unit 820 detects the first wakeup indication and the second wakeup indication, the processing unit 820 is further configured to determine, based on the first wakeup indication, whether the terminal device is to wake up.

Optionally, when the processing unit 820 does not detect the first wakeup indication and the second wakeup indication, the processing unit 820 is further configured to determine that the terminal device is not to wake up.

Optionally, the first wakeup indication is included on a first wakeup channel for the terminal device, or is included on a first wakeup channel for a first group of terminal devices including the terminal device.

Optionally, the second wakeup indication is a second wakeup signal, or the second wakeup indication is included on a second wakeup channel for a second group of terminal devices including the terminal device.

Optionally, both the first wakeup indication and the second wakeup indication are located on a physical downlink control channel PDCCH.

Optionally, a channel on which the first wakeup indication is located is a PDCCH, and the second wakeup indication is a first demodulation reference signal.

Optionally, the configuration information of the second wakeup indication includes transmission occasion information of the second wakeup indication.

Optionally, the configuration information of the second wakeup indication includes a first scrambling code of the second wakeup indication, the first demodulation reference signal is scrambled by using the first scrambling code, a second demodulation reference signal is scrambled by using a second scrambling code, and the first scrambling code is different from the second scrambling code.

Optionally, the first wakeup indication and the second wakeup indication are used to indicate whether the terminal device needs to detect, in a discontinuous reception DRX cycle, a PDCCH used to schedule data.

Figure 9:
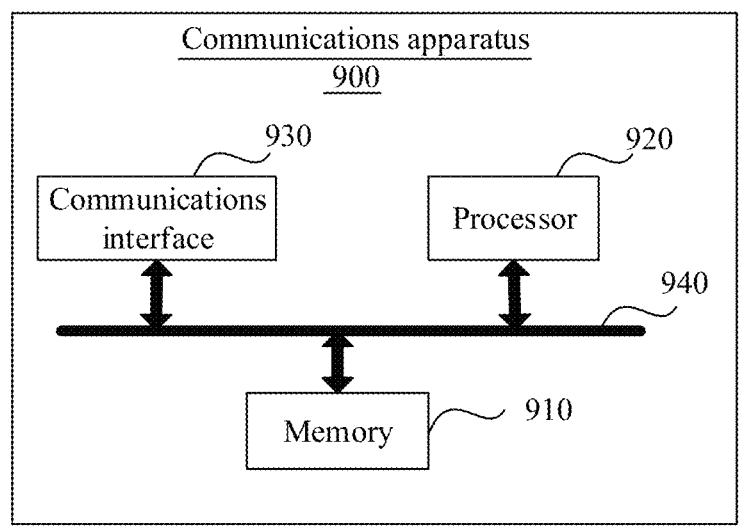
FIG. 9 is a schematic structural diagram of a communications apparatus according to an embodiment of this application.

FIG. 9 is a schematic structural diagram of a communications apparatus according to an embodiment of this application. The communications apparatus 900 in FIG. 9 may be a specific example of the terminal device 120 in FIG. 1. The communications apparatus shown in FIG. 9 may be configured to perform the methods shown in FIG. 4 to FIG. 7. To avoid redundancy, descriptions are not repeated.

The communications apparatus may be a terminal device, may be an apparatus in the terminal device, or may be an apparatus that can match the terminal device for using. The communications apparatus may be a chip system. In this embodiment of this application, the chip system may include a chip, or may include a chip and another discrete device. The communications apparatus 900 includes at least one processor 920, configured to implement the methods provided in the embodiments of this application. For example, the processor 920 may be configured to detect the first wakeup indication and the second wakeup indication based on the received configuration information of the first wakeup indication and the received configuration information of the second wakeup indication. For details, refer to detailed descriptions in the method examples. Details are not described herein again. Optionally, functions of the processor 920 are the same as those of the processing unit 820.

The communications apparatus 900 may further include at least one memory 910, configured to store a program instruction and/or data. The memory 910 is coupled to the processor 920. Couplings in this embodiment of this application are indirect couplings or communication connections between apparatuses, units, or modules, may be implemented in electrical, mechanical, or other forms, and are used for information exchange between the apparatuses, the units, or the modules. The processor 920 may cooperate with the memory 910. The processor 920 may execute the program instruction stored in the memory 910. At least one of the at least one memory may be included in the processor.

The communications apparatus 900 may further include a communications interface 930, configured to communicate with another device by using a transmission medium, so that an apparatus in the communications apparatus 900 can communicate with the another device. For example, the communications interface may be a transceiver, a circuit, a bus, a module, a pin, or another type of communications interface. For example, the communications apparatus 900 is a terminal device, and the another device is a network device. The processor 920 receives and sends data through the communications interface 930, and is configured to implement the methods performed by the terminal device in the embodiments corresponding to FIG. 4 to FIG. 7.

In this embodiment of this application, a specific connection medium between the communications interface 930, the processor 920, and the memory 910 is not limited. In this embodiment of this application, the memory 910, the processor 920, and the communications interface 930 are connected by using a bus 940 in FIG. 9. The bus is represented by using a bold line in FIG. 9. A connection manner of other components is merely schematically described and is not restrictive. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
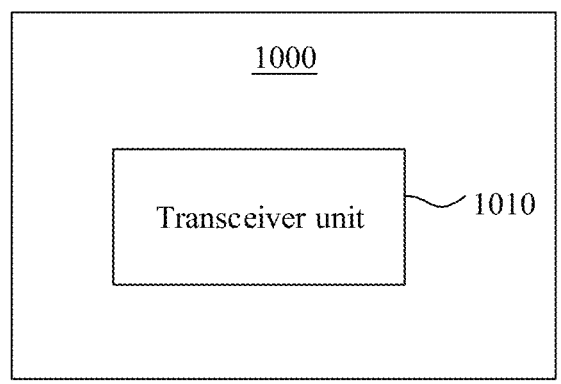
FIG. 10 is a schematic structural diagram of a network device according to another embodiment of this application.

FIG. 10 is a schematic structural diagram of a network device according to an embodiment of this application. The network device 1000 in FIG. 10 may be a specific example of the network device 110 in FIG. 1. The apparatus shown in FIG. 10 may be configured to perform the method shown in FIG. 4, and specifically implement the embodiments shown in FIG. 5 to FIG. 7. To avoid redundancy, descriptions are not repeated.

The network device 1000 shown in FIG. 10 includes a transceiver unit 1010.

The transceiver unit 1010 is configured to send, to a first terminal device, configuration information of a first wakeup indication and configuration information of a second wakeup indication, where the first wakeup indication is used to indicate whether the first terminal device is to wake up, and the second wakeup indication is used to indicate whether at least one terminal device including the first terminal device is to wake up; where the transceiver unit 1010 is further configured to send the second wakeup indication to the first terminal device, or the transceiver unit is further configured to send the first wakeup indication and the second wakeup indication to the first terminal device.

Optionally, when the network device needs to wake up the first terminal device, the transceiver unit 1010 is specifically configured to send the second wakeup indication to the first terminal device, where the second wakeup indication is used to indicate that the at least one terminal device is to wake up.

Optionally, when the network device needs to wake up the first terminal device, the transceiver unit 1010 is specifically configured to send the first wakeup indication and the second wakeup indication to the first terminal device, where the first wakeup indication is used to indicate that the first terminal device is to wake up, and the second wakeup indication is used to indicate that the at least one terminal device is to wake up, or is used to indicate that the at least one terminal device is not to wake up.

Optionally, the at least one terminal device further includes a second terminal device, and when the network device does not need to wake up the first terminal device but needs to wake up the second terminal device, the transceiver unit 1010 is specifically configured to send the first wakeup indication and the second wakeup indication to the first terminal device, where the first wakeup indication is used to indicate that the first terminal device is not to wake up, and the second wakeup indication is used to indicate that the at least one terminal device is to wake up.

Optionally, when the network device does not need to wake up the first terminal device but needs to wake up the second terminal device, the transceiver unit 1010 is further configured to send the second wakeup indication to the second terminal device.

Optionally, when the network device does not need to wake up the first terminal device but needs to wake up the second terminal device, the transceiver unit 1010 is further configured to send a third wakeup indication and the second wakeup indication to the second terminal device, where the third wakeup indication is used to indicate that the second terminal device is to wake up.

Optionally, the first wakeup indication is included on a first wakeup channel for the first terminal device, or is included on a first wakeup channel for a first group of terminal devices including the first terminal device.

Optionally, the second wakeup indication is a second wakeup signal, or the second wakeup indication is included on a second wakeup channel for a second group of terminal devices including the first terminal device.

Optionally, both the first wakeup indication and the second wakeup indication are located on a physical downlink control channel PDCCH.

Optionally, a channel on which the first wakeup indication is located is a PDCCH, and the second wakeup indication is a first demodulation reference signal.

Optionally, the configuration information of the second wakeup indication includes transmission occasion information of the second wakeup indication.

Optionally, the configuration information of the second wakeup indication includes a first scrambling code of the second wakeup indication, the first demodulation reference signal is scrambled by using the first scrambling code, a second demodulation reference signal is scrambled by using a second scrambling code, and the first scrambling code is different from the second scrambling code.

Optionally, the first wakeup indication and the second wakeup indication are used to indicate whether the first terminal device needs to detect, in a discontinuous reception DRX cycle, a PDCCH used to schedule data.

Figure 11:
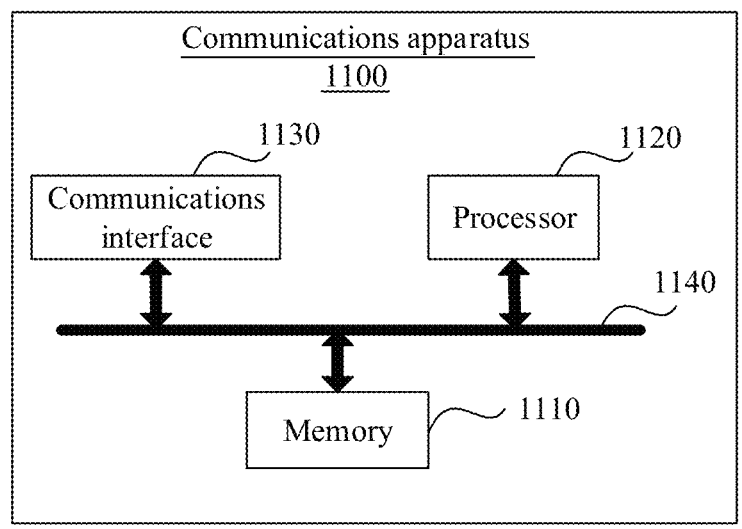
FIG. 11 is a schematic structural diagram of a communications apparatus according to another embodiment of this application.

FIG. 11 is a schematic structural diagram of a communications apparatus according to an embodiment of this application. The communications apparatus 1100 in FIG. 11 may be a specific example of the network device 110 in FIG. 1. The communications apparatus shown in FIG. 11 may be configured to perform the methods shown in FIG. 4 to FIG. 7. To avoid redundancy, descriptions are not repeated.

The communications apparatus may be a network device, may be an apparatus in the network device, or may be an apparatus that can match the network device for using. The communications apparatus may be a chip system. In this embodiment of this application, the chip system may include a chip, or may include a chip and another discrete device. The communications apparatus 1100 includes at least one processor 1120, configured to implement the methods provided in the embodiments of this application. For details, refer to detailed descriptions in the method examples. Details are not described herein again.

The communications apparatus 1100 may further include at least one memory 1110, configured to store a program instruction and/or data. The memory 1110 is coupled to the processor 1120. Couplings in this embodiment of this application are indirect couplings or communication connections between apparatuses, units, or modules, may be implemented in electrical, mechanical, or other forms, and are used for information exchange between the apparatuses, the units, or the modules. The processor 1120 may cooperate with the memory 1110. The processor 1120 may execute the program instruction stored in the memory 1110. At least one of the at least one memory may be included in the processor.

The communications apparatus 1100 may further include a communications interface 1130, configured to communicate with another device by using a transmission medium, so that an apparatus in the communications apparatus 1100 can communicate with the another device. For example, the communications interface may be a transceiver, a circuit, a bus, a module, a pin, or another type of communications interface. For example, the communications apparatus 1100 is a terminal device, and the another device is a network device. The processor 1120 receives and sends data through the communications interface 1130, and is configured to implement the methods performed by the terminal device in the embodiments corresponding to FIG. 4 to FIG. 7.

In this embodiment of this application, a specific connection medium between the communications interface 1130, the processor 1120, and the memory 1110 is not limited. In this embodiment of this application, the memory 1110, the processor 1120, and the communications interface 1130 are connected by using a bus 1140 in FIG. 11. The bus is represented by using a bold line in FIG. 11. A connection manner of other components is merely schematically described and is not restrictive. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 11, but this does not mean that there is only one bus or only one type of bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several indications for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device wakeup method, comprising:
    receiving, by a first terminal device, configuration information of a first wakeup indication from a network device, wherein the first wakeup indication is used to indicate whether the first terminal device is to wake up, and the configuration information of the first wakeup indication comprises configuration information of a search space of the first wakeup indication;
    detecting, by the first terminal device, the first wakeup indication based on the configuration information of the first wakeup indication;
    in response to that the first wakeup indication is not detected and that the configuration information of the first wakeup indication carries first indication information, determining, by the first terminal device, to wake up, wherein the first indication information indicates the first terminal device to wake up when the first wakeup indication is not detected; and
    in response to that the first wakeup indication is not detected and that the configuration information of the first wakeup indication does not carry the first indication information, determining, by the first terminal device, not to wake up.

2. The method according to claim 1, further comprising: determining, by the first terminal device, whether to wake up in response to that the first wakeup indication is detected.

3. The method according to claim 1, wherein a first wakeup channel on which the first wakeup indication is located is a physical downlink control channel (PDCCH).

4. The method according to claim 3, wherein the configuration information of the first wakeup indication comprises configuration information of a control resource set in which the first wakeup channel is located and configuration information of a search space of the first wakeup channel.

5. The method according to claim 3, wherein the configuration information of the first wakeup indication comprises a radio network temporary identifier (RNTI) corresponding to downlink control information (DCI) for the first terminal device and bit field location information of the first wakeup indication in the DCI.

6. The method according to claim 3, wherein the first wakeup channel carries first downlink control information (DCI), the first DCI comprises a plurality of bits, and information about one or more first bits in the plurality of bits is used to indicate the first wakeup indication.

7. The method according to claim 6, wherein information about one first bit in the plurality of bits is used to indicate the first wakeup indication, that the first bit is set to 1 indicates that the first terminal device needs to wake up, and that the first bit is set to 0 indicates that the first terminal device is not to wake up.

8. A communications apparatus, comprising:
one or more processors; and
one or more memories coupled to the one or more processors and storing programming instructions for execution by the one or more processors to cause the apparatus to perform operations comprising:
receiving configuration information of a first wakeup indication from a network device, wherein the first wakeup indication is used to indicate whether the apparatus is to wake up, and the configuration information of the first wakeup indication comprises configuration information of a search space of the first wakeup indication;
detecting the first wakeup indication based on the configuration information of the first wakeup indication;
in response to that the first wakeup indication is not detected and that the configuration information of the first wakeup indication carries first indication information, determining, by the apparatus, to wake up, wherein the first indication information indicates the apparatus to wake up when the first wakeup indication is not detected; and
in response to that the first wakeup indication is not detected and that the configuration information of the first wakeup indication does not carry the first indication information, determining, by the apparatus, not to wake up.

9. The apparatus according to claim 8, the operations further comprising:
determining whether to wake up in response to that the first wakeup indication is detected.

10. The apparatus according to claim 8, wherein a first wakeup channel on which the first wakeup indication is located is a physical downlink control channel (PDCCH).

11. The apparatus according to claim 10, wherein the configuration information of the first wakeup indication comprises configuration information of a control resource set in which the first wakeup channel is located and configuration information of a search space of the first wakeup channel.

12. The apparatus according to claim 10, wherein the configuration information of the first wakeup indication comprises a radio network temporary identifier (RNTI) corresponding to downlink control information (DCI) for the apparatus and bit field location information of the first wakeup indication in the DCI.

13. The apparatus according to claim 10, wherein the first wakeup channel carries first downlink control information (DCI), the first DCI comprises a plurality of bits, and information about one or more first bits in the plurality of bits is used to indicate the first wakeup indication.

14. The apparatus according to claim 13, wherein information about one first bit in the plurality of bits is used to indicate the first wakeup indication, that the first bit is set to 1 indicates that the apparatus needs to wake up, and that the first bit is set to 0 indicates that the apparatus is not to wake up.

15. A non-transitory computer-readable storage medium comprising instructions which, when executed by one or more processors, cause the one or more processors to perform operations comprising:
receiving configuration information of a first wakeup indication from a network device, wherein the first wakeup indication is used to indicate whether a first terminal device is to wake up, and the configuration information of the first wakeup indication comprises configuration information of a search space of the first wakeup indication;
detecting the first wakeup indication based on the configuration information of the first wakeup indication;
in response to that the first wakeup indication is not detected and that the configuration information of the first wakeup indication carries first indication information, determining to wake up, wherein the first indication information indicates the first terminal device to wake up when the first wakeup indication is not detected; and
in response to that the first wakeup indication is not detected and that the configuration information of the first wakeup indication does not carry the first indication information, determining not to wake up.

16. The medium according to claim 15, the operations further comprising:
determining, by the first terminal device, whether to wake up in response to that the first wakeup indication is detected.

17. The medium according to claim 15, wherein a first wakeup channel on which the first wakeup indication is located is a physical downlink control channel (PDCCH).

18. The medium according to claim 17, wherein the configuration information of the first wakeup indication comprises configuration information of a control resource set in which the first wakeup channel is located and configuration information of a search space of the first wakeup channel.

19. The medium according to claim 17, wherein the configuration information of the first wakeup indication comprises a radio network temporary identifier (RNTI) corresponding to downlink control information (DCI) for the first terminal device and bit field location information of the first wakeup indication in the DCI.

20. The medium according to claim 17, wherein the first wakeup channel carries first downlink control information (DCI), the first DCI comprises a plurality of bits, and information about one or more first bits in the plurality of bits is used to indicate the first wakeup indication.

21. The medium according to claim 20, wherein information about one first bit in the plurality of bits is used to indicate the first wakeup indication, that the first bit is set to 1 indicates that the first terminal device needs to wake up, and that the first bit is set to 0 indicates that the first terminal device is not to wake up.

* * * * *